United States Patent
Akiyama et al.

(10) Patent No.: US 10,142,343 B2
(45) Date of Patent: Nov. 27, 2018

(54) UNAUTHORIZED ACCESS DETECTING SYSTEM AND UNAUTHORIZED ACCESS DETECTING METHOD

(71) Applicant: NIPPON TELEGRAPH AND TELEPHONE CORPORATION, Chiyoda-ku (JP)

(72) Inventors: Mitsuaki Akiyama, Musashino (JP); Takeshi Yagi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 213 days.

(21) Appl. No.: 14/901,934

(22) PCT Filed: Jun. 19, 2014

(86) PCT No.: PCT/JP2014/066272
§ 371 (c)(1),
(2) Date: Dec. 29, 2015

(87) PCT Pub. No.: WO2015/001969
PCT Pub. Date: Jan. 8, 2015

(65) Prior Publication Data
US 2016/0373447 A1   Dec. 22, 2016

(30) Foreign Application Priority Data

Jul. 5, 2013 (JP) ................................ 2013-141770
Jul. 5, 2013 (JP) ................................ 2013-141772

(51) Int. Cl.
*H04L 29/06* (2006.01)
*H04L 12/26* (2006.01)
(Continued)

(52) U.S. Cl.
CPC .............. *H04L 63/10* (2013.01); *G06F 21/55* (2013.01); *H04L 63/145* (2013.01);
(Continued)

(58) Field of Classification Search
CPC ...... G06F 21/55; G06F 21/556; G06F 21/577; G06F 21/566; G06F 21/568; H04L 63/10;
(Continued)

(56) References Cited

U.S. PATENT DOCUMENTS 7,665,134 B1 * 2/2010 Hernacki ................ G06F 21/55
713/161
7,814,549 B2 * 10/2010 Park ........................ G06F 21/57
726/22
(Continued)

FOREIGN PATENT DOCUMENTS

CN 101960465 A 1/2011
CN 102315992 A 1/2012
(Continued)

OTHER PUBLICATIONS

Chen, Kevin Zhijie, et al. "WebPatrol: Automated collection and replay of web-based malware scenarios." Proceedings of the 6th ACM Symposium on Information, Computer and Communications Security. ACM, 2011.*
(Continued)

*Primary Examiner* — Michael Simitoski
(74) *Attorney, Agent, or Firm* — Oblon, McClelland, Maier & Neustadt, L.L.P.

(57) ABSTRACT

In an unauthorized access detecting system, authentication information to be leaked outside is generated. In the unauthorized access detecting system, the generated authentication information is set on an analyzing host, and a program to be analyzed is operated on the analyzing host. In the unauthorized access detecting system, access to a content
(Continued)

| ANALYZED PROGRAM | CLIENT APPLICATION | AUTHENTICATION INFORMATION |
|---|---|---|
| PROGRAM 1 | SSH | AUTHENTICATION INFORMATION A |
| PROGRAM 2 | FTP | AUTHENTICATION INFORMATION B |
| PROGRAM 3 | SSH | AUTHENTICATION INFORMATION C |
| PROGRAM 3 | FTP | AUTHENTICATION INFORMATION D |
| PROGRAM 3 | POP | AUTHENTICATION INFORMATION E | using the authentication information is detected, and if the access using the authentication information is detected, the access is identified as unauthorized access.

8 Claims, 19 Drawing Sheets

(51) Int. Cl.
  *G06F 21/55* (2013.01)
  *G06F 12/14* (2006.01)
(52) U.S. Cl.
  CPC ...... *H04L 63/1416* (2013.01); *H04L 63/1491* (2013.01); *H04L 63/102* (2013.01)
(58) Field of Classification Search
  CPC ............... H04L 63/102; H04L 63/1416; H04L 63/1408; H04L 63/145; H04L 63/1491
  See application file for complete search history.

(56) References Cited

U.S. PATENT DOCUMENTS

| | | | | |
|---|---|---|---|---|
| 8,321,910 | B1* | 11/2012 | English | G06F 17/30144 726/2 |
| 8,549,643 | B1* | 10/2013 | Shou | G06F 21/556 455/410 |
| 8,626,125 | B2 | 1/2014 | Lee et al. | |
| 8,707,437 | B1* | 4/2014 | Ming-Chang | G06F 21/554 726/22 |
| 8,839,433 | B2* | 9/2014 | O'Reirdan | H04L 63/1416 709/207 |
| 8,990,944 | B1* | 3/2015 | Singh | G06F 21/56 726/24 |
| 9,356,957 | B2* | 5/2016 | Keromytis | H04L 63/145 |
| 9,565,202 | B1* | 2/2017 | Kindlund | H04L 63/1441 |
| 9,667,637 | B2* | 5/2017 | Zeitlin | H04L 63/1416 |
| 9,740,877 | B2* | 8/2017 | Medvedev | G06F 21/6218 |
| 2003/0145224 | A1* | 7/2003 | Bailey | H04L 63/083 726/5 |
| 2005/0193429 | A1* | 9/2005 | Demopoulos | G06F 21/552 726/23 |
| 2007/0260643 | A1* | 11/2007 | Borden | G06F 17/30097 |
| 2007/0261112 | A1* | 11/2007 | Todd | G06F 21/577 726/11 |
| 2008/0163370 | A1* | 7/2008 | Maynard | H04L 43/00 726/22 |
| 2009/0241173 | A1* | 9/2009 | Troyansky | G06F 21/552 726/5 |
| 2009/0241196 | A1* | 9/2009 | Troyansky | G06F 21/552 726/25 |
| 2009/0320134 | A1* | 12/2009 | Corcoran | G06F 21/562 726/24 |
| 2009/0328216 | A1* | 12/2009 | Rafalovich | H04L 43/0876 726/23 |
| 2010/0071051 | A1* | 3/2010 | Choyi | H04L 63/145 726/12 |
| 2010/0077483 | A1* | 3/2010 | Stolfo | G06F 21/554 726/24 |
| 2010/0325710 | A1* | 12/2010 | Etchegoyen | G06F 21/31 726/7 |
| 2011/0035783 | A1 | 2/2011 | Terasaki et al. | |
| 2011/0167494 | A1* | 7/2011 | Bowen | G06F 21/566 726/24 |
| 2011/0214182 | A1* | 9/2011 | Adams | G06F 21/00 726/23 |
| 2012/0192278 | A1* | 7/2012 | Kito | G06F 21/52 726/24 |
| 2012/0240236 | A1* | 9/2012 | Wyatt | G06F 21/564 726/25 |
| 2013/0052992 | A1 | 2/2013 | Lee et al. | |
| 2013/0103944 | A1* | 4/2013 | Adams | H04W 12/12 713/168 |
| 2013/0227078 | A1* | 8/2013 | Wei | H04L 67/2814 709/219 |
| 2013/0263226 | A1* | 10/2013 | Sudia | H04L 63/1466 726/4 |
| 2013/0283377 | A1* | 10/2013 | Das | G06F 21/51 726/23 |
| 2014/0096236 | A1 | 4/2014 | Lee et al. | |
| 2014/0298469 | A1* | 10/2014 | Marion | G06F 21/55 726/23 |
| 2015/0058997 | A1* | 2/2015 | Lee | G06F 9/45558 726/26 |
| 2015/0172305 | A1* | 6/2015 | Dixon | G06F 21/53 726/23 |
| 2015/0326588 | A1* | 11/2015 | Vissamsetty | H04L 63/1491 726/23 |
| 2017/0171244 | A1* | 6/2017 | Vissamsetty | H04L 63/1491 |

FOREIGN PATENT DOCUMENTS

| | | | |
|---|---|---|---|
| CN | 102473221 | A | 5/2012 |
| CN | 103108074 | A | 5/2013 |
| JP | 10-124457 | A | 5/1998 |
| JP | 2006-099590 | A | 4/2006 |
| JP | 2012-083849 | A | 4/2012 |
| JP | 2014-110046 | A | 6/2014 |
| WO | WO 2009/032379 | A1 | 3/2009 |

OTHER PUBLICATIONS

Combined Chinese Office Action and Search Report dated Jul. 10, 2017 in Patent Application No. 201480038116.2 (with English Translation and English Translation of Category of Cited Documents).
"Suricata Downloads" [online], retrieved on May 15, 2013, from the Internet http://www.openinfosecfoundation.org/index.php/download-suricata.
"Trend Micro Integrated Data Loss Prevention" [online], retrieved on May 1, 2013, from the Internet: http://jp.trendmicro.com/jp/products/enterprise/tmdlp/ Corresponding to "Trend Micro Integrated Data Loss Prevention" from the Internet: http://www.trendmicro.com/cloud-content/us/pdfs/business/_data_sheets/_dsintegrateddata-loss-prevention.pdf.
"RSA DLP (Data Loss Prevention) Suite" [online], retrieved on May 1, 2013, from the Internet: http://japan.rsa.com/node.aspx?id=3426 Corresponding to "RSA Data Loss Prevention" from the Internet: http://www.emc.com/security/rsa-data-loss-prevention.htm#!.
"McAfee Data Loss Prevention Endpoint" [online], retrieved on May 1, 2013, from the Internet http://www.mcafee.com/japan/products/data_loss_prevention.asp Corresponding to "McAfee DLP Prevent" from the Internet: http://www.mcafee.com/us/products/dlp-prevent.aspx.
Takeshi Yagi, "Design of an FTP Honeypot for Expanding the Search Scope in Attack Space", CSS2012 Computer Security Symposium 2012 Ronbunshu, Oct. 23, 2012, vol. 2012, No. 3, pp. 823-827 (with partial English translation).
Takeshi Yagi, "Analysis of Website Infections using Malware", IEICE Technical Report, Jun. 9, 2011, vol. 111, No. 82, pp. 75-80 (with partial English translation).
International Search Report dated Sep. 16, 2014 for PCT/JP2014/066272 filed on Jun. 19, 2014.
Extended European Search Report dated Nov. 21, 2016 in Patent Application No. 14819369.1.
Mitsuaki Akiyama, et al., "Scalable and Performance-Efficient Client Honeypot on High Interaction System" IEEE/IPSJ 12th International Symposium on Applications and the Internet, XP032240389, Jul. 16, 2012, pp. 40-50.
Takeshi Yagi, et al., "Life-cycle Monitoring Scheme of Malware Download Sites for Websites" IEEE International Conference on Service-Oriented Computing and Applications, XP031898675, Dec. 13, 2010, pp. 1-6.

\* cited by examiner

| ANALYZED PROGRAM | CLIENT APPLICATION | AUTHENTICATION INFORMATION |
|---|---|---|
| PROGRAM 1 | SSH | AUTHENTICATION INFORMATION A |
| PROGRAM 2 | FTP | AUTHENTICATION INFORMATION B |
| PROGRAM 3 | SSH | AUTHENTICATION INFORMATION C |
| PROGRAM 3 | FTP | AUTHENTICATION INFORMATION D |
| PROGRAM 3 | POP | AUTHENTICATION INFORMATION E |

UNAUTHORIZED ACCESS DETECTING SYSTEM AND UNAUTHORIZED ACCESS DETECTING METHOD

FIELD

The present invention relates to an unauthorized access detecting system and an unauthorized access detecting method.

BACKGROUND

In recent years, by a computer terminal or a server (hereinafter, referred to as "host" without distinguishment between them) becoming infected with malware, which is malicious software, destruction of information inside the host and cases where the host itself is abused as a stepping stone to new attacks have been occurring. Further, the malware is also able to leak out information in the host to outside without permission. Since not only personal information, but also confidential information of a company, a government, a military organization, or the like may be leaked out, information leakage by malware infection has been a problem.

Infection means through various infection routes have been confirmed for malware, including, for example: infection by a user clicking and installing malware appearing as a file attached to an e-mail; malware appearing as general software distributed on a Web site; malware appearing as a P2P file; infection by malware being automatically downloaded and installed when a Web site including an attack code is browsed with a Web browser having vulnerability; and the like.

Further, there has been unauthorized access to various services provided on the Internet. Much of the unauthorized access is performed by breaking thorough authentication information (for example, an account name and a password) by brute force (login attempted by an attacker using all possible combinations of account names and passwords) or performed by using genuine authentication information stolen by some means from a user in advance. Since logins are continuously executed when authentication information is broken through by brute force, based on a threshold of the number of login trials per unit time, the detection and protection are possible by an intrusion prevention system (IPS) or the like (see, for example, Non-Patent Literature 1).

Further, against such malware infection, antivirus vendors generate signatures of malware to prevent hosts from being infected with malware. However, for these signatures, detailed analysis of malware is required, and thus signature generation is costly time-wise.

Many conventional measures against information leakage prevent leakage of confidential data by setting access rights with respect to information for users. These do not cover a case in which a user having an access right intentionally leaks out information to outside. Further, if that user copies the information, protection with respect to the copied data is not covered.

A technique called data loss prevention or data leak prevention (DLP) has been recently used as a method of preventing information leakage by control focused on information (see, for example, Non-Patent Literatures 2 to 4). In DLP, access to or transmission of information having confidentiality is monitored, and in particular, the transmission to outside is prevented. This may be achieved by a method of controlling information on a host, or by a method of performing control by monitoring contents of communication on a network.

As the former method of controlling information on a host, a method of monitoring access to confidential information by using an agent program installed on a host used by a user has been known. For example, if confidential information is attempted to be downloaded from a file server and to be copied into an external storage, such as a USB memory, protection is performed by a warning sentence or the like being displayed on a screen. If the confidential information is attempted to be transmitted to outside as a file attached to an e-mail, protection is performed by a similar process.

As the latter method of monitoring contents of communication on a network, a method of monitoring contents of communication on a network by using an appliance that analyzes the communication on the network has been known. For example, if confidential information is attempted to be transmitted to outside as a file attached to an e-mail, the appliance checks contents of the communication and blocks the transmission.

CITATION LIST

Non-Patent Literature

Non-Patent Literature 1: "Suricata Downloads" [online], [retrieved on May 15, 2013] from the Internet: <URL: http://www.openinfosecfoundation.org/index.php/download-suricata>

Non-Patent Literature 2: "Trend Micro Data Loss Prevention" [online], [retrieved on May 1, 2013] from the Internet: <URL: http://jp.trendmicro.com/jp/products/enterprise/tmdlp/>

Non-Patent Literature 3: "RSA DLP (Data Loss Prevention) Suite" [online], [retrieved on May 1, 2013] from the Internet: <URL: http://japan.rsa.com/node.aspx?id=3426>

Non-Patent Literature 4: "McAfee Data Loss Prevention Endpoint" [online], [retrieved on May 1, 2013] from the Internet <URL: http://www.mcafee.com/japan/products/data_loss_prevention.asp>

SUMMARY

Technical Problem

However, the conventional techniques have a problem that identification of unauthorized access, or identification of a program that performs the unauthorized access may not be possible.

For example, if unauthorized access is performed by use of genuine authentication information stolen by some means from a user, an attacker will perform login by using the genuine authentication information, and thus distinction between access by the authorized user and access by the attacker is difficult. Thus, it has been a problem to properly perform detection of unauthorized access that uses leaked authentication information.

Further, for example, in the above described method of controlling information on a host by using an agent program, if the host is infected with malware, operation may be performed with this agent program being stopped. Therefore, complete protection against information leakage operation on a host is difficult.

Further, for example, in the above described method of monitoring contents of communication on a network, if malware encrypts the contents of communication, it is difficult to identify what kind of information is actually being transmitted just by the contents of communication.

Further, for example, various programs exist on the Internet, and in order to determine whether such a program is malware that leaks out information, detailed analysis of the program is required. However, since malware generally has analysis-resistant functions, such as a code obfuscation function and an anti-debugging function, and the contents of communication themselves are often encrypted, it is difficult to determine whether information leakage is performed.

Therefore, an object of this invention is to properly identify unauthorized access, or identify a program that performs the unauthorized access.

Solution to Problem

An unauthorized access detecting system includes: a generating unit that generates authentication information to be leaked outside; an operating unit that sets the authentication information generated by the generating unit on a host and causes a program to be analyzed to operate on the host; a detecting unit that detects access to a content using the authentication information; and an identifying unit that identifies, if access using the authentication information is detected by the detecting unit, the access as unauthorized access.

Further, an unauthorized access detecting method executed by an unauthorized access detecting system, the unauthorized access detecting method includes: a generating step of generating authentication information to be leaked outside; an operating step of setting the authentication information generated by the generating step on a host and causing a program to be analyzed to operate on the host; a detecting step of detecting access to a content using the authentication information; and an identifying step of identifying, if access using the authentication information is detected by the detecting step, the access as unauthorized access.

Further, an unauthorized access detecting system includes: a generating unit that generates authentication information; an operating unit that sets the authentication information generated by the generating unit on a host and causes a program to be analyzed to operate on the host; a detecting unit that detects unauthorized access to a content using the authentication information; and an identifying unit that identifies, as a program that leaks out information, a program that operates on the host set with the authentication information if unauthorized access using the authentication information has been detected by the detecting unit.

Further, an unauthorized access detecting method executed by an unauthorized access detecting system, the unauthorized access detecting method includes: a generating step of generating authentication information; an operating step of setting the authentication information generated by the generating step on a host and causing a program to be analyzed to operate on the host; a detecting step of detecting unauthorized access to a content using the authentication information; and an identifying step of identifying, if unauthorized access using the authentication information is detected by the detecting step, a program that operates on the host set with the authentication information, as a program that leaks out information.

Advantageous Effects of Invention

An unauthorized access detecting system and an unauthorized access detecting method disclosed in this application are able to properly identify unauthorized access or identify a program that performs the unauthorized access.

DESCRIPTION OF EMBODIMENTS

Hereinafter, with reference to the drawings, embodiments of an unauthorized access detecting system and an unauthorized access detecting method according to this invention will be described in detail. The invention is not limited by these embodiments.

[First Embodiment]

Hereinafter, flows of processes by an unauthorized access detecting system and an unauthorized access detecting method according to a first embodiment will be described in sequence, and lastly, effects by the first embodiment will be described.

[Configuration of System]

Figure 1:
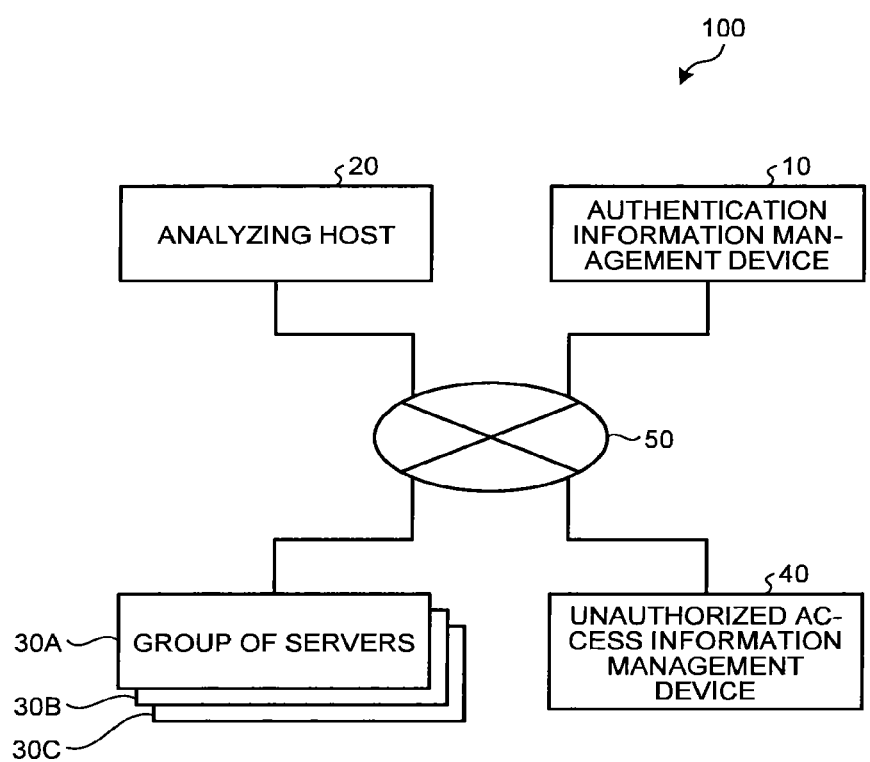
FIG. 1 is a diagram illustrating an example of a configuration of an unauthorized access detecting system according to a first embodiment.

First of all, an example of a configuration of an unauthorized access detecting system 100 according to the first embodiment will be described. FIG. 1 is a diagram illustrating the example of the configuration of the unauthorized access detecting system according to the first embodiment. As illustrated in FIG. 1, the unauthorized access detecting system 100 has an authentication information management device 10, an analyzing host 20, a group of servers 30A to 30C, and an unauthorized access information management device 40. Further, in the unauthorized access detecting system 100, the authentication information management device 10, the analyzing host 20, and the group of servers 30A to 30C are connected to one another via the Internet 50. As for the group of servers 30A to 30C, if one of the servers is described without any particular distinction among them, that server will be referred to as "server 30".

The authentication information management device 10 generates authentication information for analysis and manages correspondence between the generated authentication information and a program set with the authentication information. Further, the authentication information management device 10 performs transmission to the analyzing host 20. The generated authentication information corresponds respectively to the servers 30A and 30C and as the authentication information, site information of a service, an account name, and a password are generated. The site information of a service is information on a server that provides a service for monitoring unauthorized access using authentication information for analysis, and is, for example, an IP address or FQDN of the group of servers 30A to 30C. Further, the account name and password are randomly generated, and those, which are not being actually used, are generated.

The analyzing host 20 sets authentication information of a particular service that is on the analyzing host 20 and causes a program to be analyzed to operate. The analyzing host 20 is connected to the Internet 50 in advance. If the program is malware that leaks out information, the program will secretly leak out authentication information to an outside attacker without consent of a user.

The group of servers 30A to 30C are servers that manage contents of a Web site, and are servers for causing an attacker to fraudulently make access with the authentication information intentionally leaked out. For example, if there is access using the leaked authentication information, the group of servers 30A to 30C identify the access as unauthorized access, obtains host information (for example, an IP address) of the attacker that has made the unauthorized access, and transmits the host information to the unauthorized access information management device 40.

The unauthorized access information management device 40 manages the host information of the attacker that has made the unauthorized access, and transmits the host information to the group of servers 30A to 30C. Thereby, the host of the attacker that has made the unauthorized access with respect to the group of servers 30A to 30C becomes a target to be filtered in various services.

Figure 2:
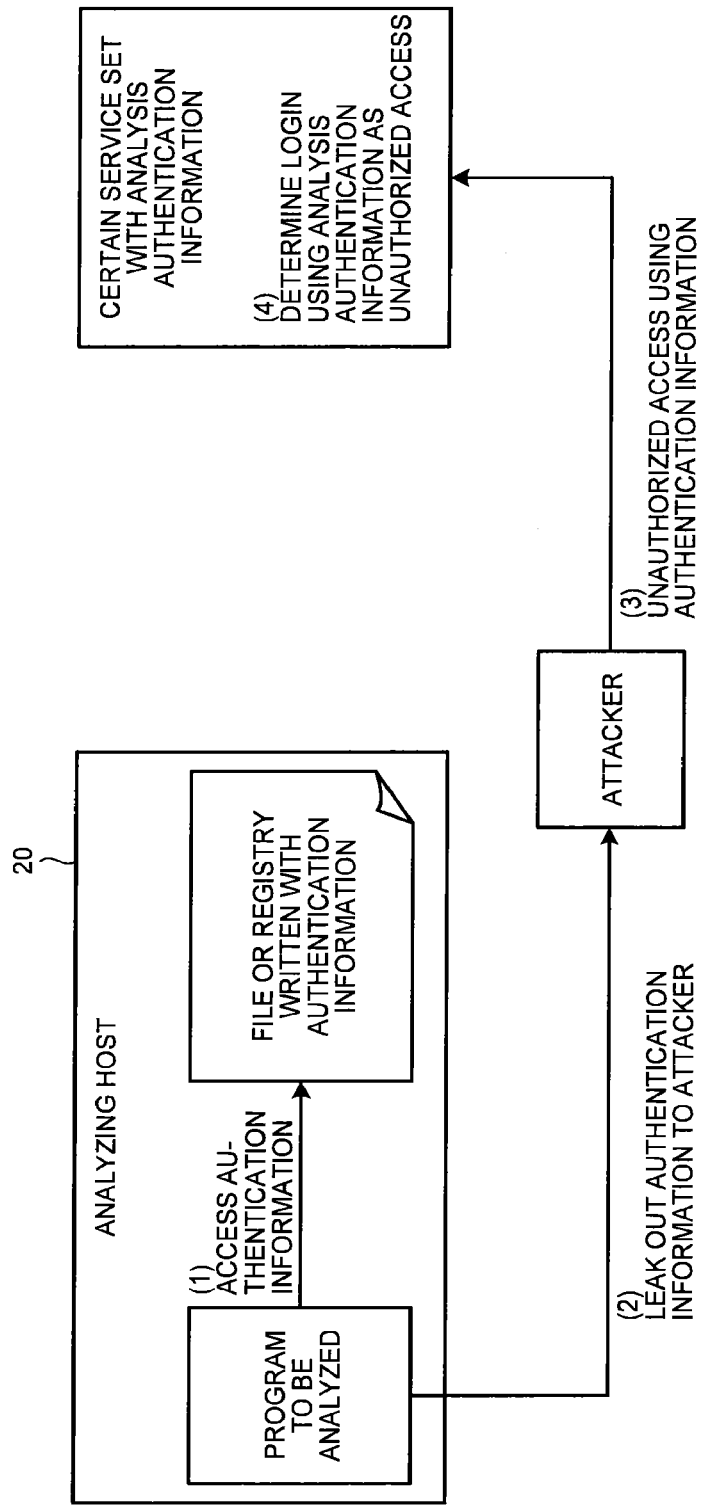
FIG. 2 is a diagram illustrating a process of leaking out analysis authentication information and a process of monitoring unauthorized access in a service set with the analysis authentication information, in the unauthorized access detecting system according to the first embodiment.

In the unauthorized access detecting system 100, as a premise, a process of intentionally causing authentication information for analysis to be leaked out and monitoring unauthorized access is performed. By use of FIG. 2, a process of leaking out analysis authentication information and a process of monitoring unauthorized access in a service set with the analysis authentication information will be described. FIG. 2 is a diagram illustrating a process of leaking out analysis authentication information and a process of monitoring unauthorized access in a service set with the analysis authentication information, in the unauthorized access detecting system according to the first embodiment.

As illustrated in FIG. 2, first, the analyzing host 20 sets, as authentication information of a particular service on the analyzing host, authentication information generated by the authentication information management device 10, and if a program to be analyzed is malware that leaks out information, the analyzing host 20 accesses a file or a registry, in which the above described authentication information is stored (see (1) in FIG. 2).

The analyzing host 20 then secretly leaks out the authentication information without the user's consent to an outside attacker (see (2) in FIG. 2).

Next, while the group of servers 30A to 30C providing a particular service are being operated, login is observed. If login by the attacker using the leaked authentication information is performed (see (3) in FIG. 2), the group of servers 30A to 30C determine that the login is unauthorized access (see (4) in FIG. 2).

As described above, by intentionally causing authentication information for analysis to be leaked out, as the same leaked authentication information is used, the use is able to be identified as unauthorized access. By obtaining host information of the attacker that has made the unauthorized access, and filtering the host information in various services, unauthorized access is able to be detected and prevented.

[Configuration of Authentication Information Management Device]

Figure 3:
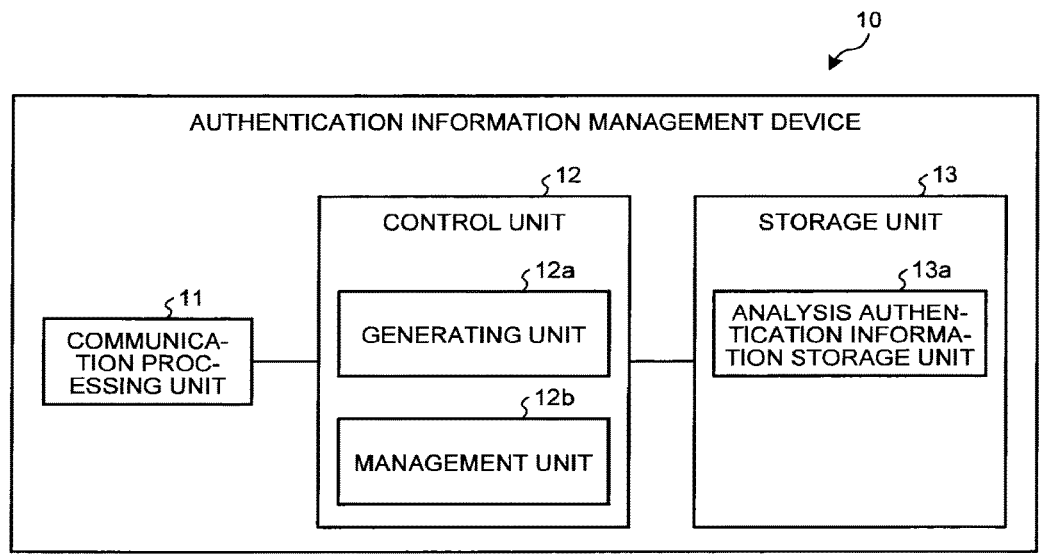
FIG. 3 is a block diagram illustrating a configuration of an authentication information management device according to the first embodiment.

Next, a configuration of the authentication information management device 10 illustrated in FIG. 3 will be described. FIG. 3 is a block diagram illustrating a configuration of the authentication information management device according to the first embodiment. As illustrated in FIG. 3, the authentication information management device 10 has a communication processing unit 11, a control unit 12, and a storage unit 13.

The communication processing unit 11 controls communication related to various types of information exchanged with the analyzing host 20, the group of servers 30A to 30C, and the like, which are connected thereto. For example, the communication processing unit 11 transmits the generated authentication information to the analyzing host 20. Further, for example, the communication processing unit 11 receives authentication information used in unauthorized access, from the group of servers 30A to 30C.

The storage unit 13 has, as illustrated in FIG. 3, an analysis authentication information storage unit 13a. The storage unit 13 is, for example: a semiconductor memory element, such as a random access memory (RAM) or a flash memory; or a storage device, such as a hard disk or an optical disk.

The analysis authentication information storage unit 13a stores therein a table in which correspondence between authentication information for analysis generated by a generating unit 12a described later and a program set with the authentication information is prescribed.

For example, as the authentication information used in analysis, the analysis authentication information storage unit 13a stores therein site information of a service, an account name, a password, and the like. The site information of a service is, for example, information related to the group of servers 30A to 30C that provide a service for monitoring unauthorized access using authentication information for analysis, and is, for example, an IP address or a fully qualified domain name (FQDN).

Further, the analysis authentication information storage unit 13a stores therein, as the account name, for example, one which is not being used in real services. Further, the analysis authentication information storage unit 13a stores therein, as the password, a character string, which is difficult to be guessed and sufficiently complex. This is for discriminating a login from a login attack by brute force when whether the password is the leaked information is identified upon the login.

Returning to FIG. 3, the control unit 12 has the generating unit 12a and a management unit 12b. The control unit 12 is an electronic circuit, such as a central processing unit (CPU) or a micro processing unit (MPU), or an integrated circuit, such as an application specific integrated circuit (ASIC) or a field programmable gate array (FPGA).

The generating unit 12a generates authentication information to be leaked outside. For example, the generating unit 12a generates, as the authentication information for analysis to be intentionally leaked out to an attacker, a set of: an IP address or FQDN of the group of servers 30A to 30C; and an account name and a password that are randomly generated. The generated authentication information may correspond to various types of services, for example, those of Secure Shell (SSH), File Transfer Protocol (FTP), Post Office Protocol (POP), and the like.

In order to accurately distinguish between login by brute force (login attempted by an attacker using all possible combinations of account names and passwords) and login using the leaked authentication information, with respect to a service in the server 30 that provides the service, the generated analysis authentication information is desirably a character string, which is randomly generated, sufficiently long, and unique.

The management unit 12b transmits the authentication information generated by the generating unit 12a, to the analyzing host 20. The transmitted authentication information is set on the analyzing host 20 and a program to be analyzed is executed. Further, the management unit 12b receives a set of authentication information corresponding to the program executed by the analyzing host 20 and stores the program correspondingly with the set of authentication information corresponding to the program into the analysis authentication information storage unit 13a.

[Configuration of Analyzing Host]

Figure 4:
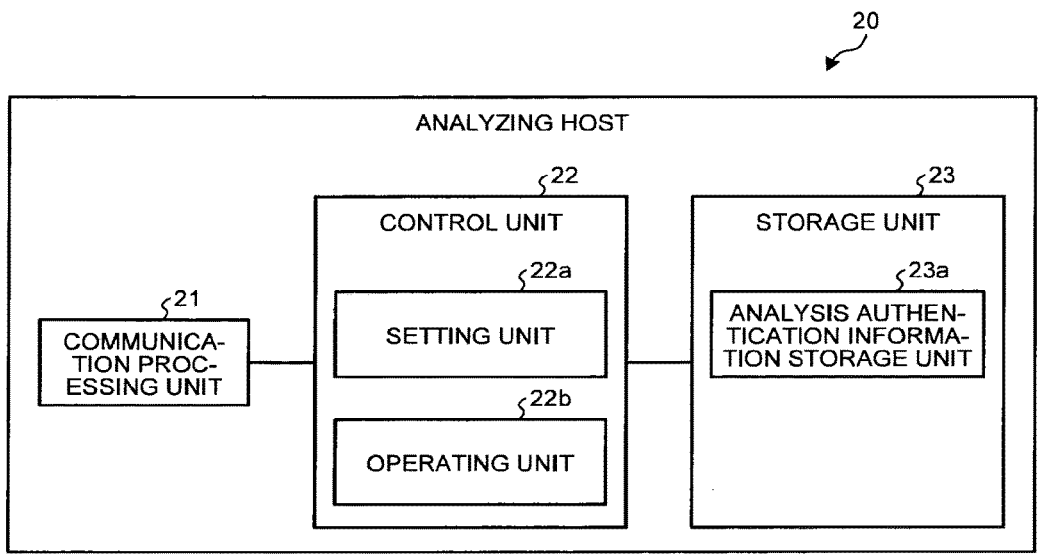
FIG. 4 is a block diagram illustrating a configuration of an analyzing host according to the first embodiment.

Next, a configuration of the analyzing host 20 illustrated in FIG. 4 will be described. FIG. 4 is a block diagram illustrating the configuration of the analyzing host according to the first embodiment. As illustrated in FIG. 4, the analyzing host 20 has a communication processing unit 21, a control unit 22, and a storage unit 23.

The communication processing unit 21 controls communication related to various types of information exchanged with the authentication information management device 10, the group of servers 30A to 30C, and the like, which are connected thereto. For example, the communication processing unit 21 receives authentication information from the authentication information management device 10. Further, for example, the communication processing unit 21 transmits authentication information to an outside attacker. If authentication information is received from the authentication information management device 10, the received authentication information is stored in an analysis authentication information storage unit 23a described later.

The storage unit 23 has, as illustrated in FIG. 4, the analysis authentication information storage unit 23a. The storage unit 23 is, for example: a semiconductor memory element, such as a random access memory (RAM) or a flash memory; or a storage device, such as a hard disk or an optical disk.

The analysis authentication information storage unit 23a stores therein the above described authentication information for analysis generated by the authentication information management device 10. For example, the analysis authentication information storage unit 23a stores therein, as the authentication information used in analysis, site information of a service, an account name, a password, and the like. The site information of a service is, for example, information related to the group of servers 30A to 30C that provide a service for monitoring unauthorized access using the authentication information for analysis, and is, for example, an IP address or a fully qualified domain name (FQDN).

Further, the analysis authentication information storage unit 23a stores therein, as the account name, one that is not being used in real services, for example. Further, the analysis authentication information storage unit 23a stores therein, as the password, a character string, which is difficult to be guessed and sufficiently complex. This is for discriminating a login from a login attack by brute force when whether the password is the leaked information is identified upon the login.

Returning to FIG. 4, the control unit 22 has a setting unit 22a and an operating unit 22b. The control unit 22 is an electronic circuit, such as a central processing unit (CPU) or a micro processing unit (MPU), or an integrated circuit, such as an application specific integrated circuit (ASIC) or a field programmable gate array (FPGA).

The setting unit 22a sets, as authentication information of a particular service, the authentication information generated by the generating unit 12a of the authentication information management device 10. For example, the setting unit 22a obtains authentication information from the analysis authentication information storage unit 23a and sets the obtained authentication information as the authentication information of the particular service.

The operating unit 22b causes a client application (of SSH, FTP, POP, or the like) of a service to operate on the analyzing host 20 set with the authentication information by the setting unit 22a, as a program to be analyzed. The operating unit 22b performs notification of the set of authentication information corresponding to the executed program. If the operated program is malware that leaks out information, the program will secretly leak out authentication information to an outside attacker without consent of a user. The authentication information to be leaked out may be of any type of service as long as whether there has been a login with the authentication information leaked by the server 30 providing the service is able to be checked. Further, the service may be prepared for the analysis, or a real service may be used.

[Configuration of Server]

Figure 5:
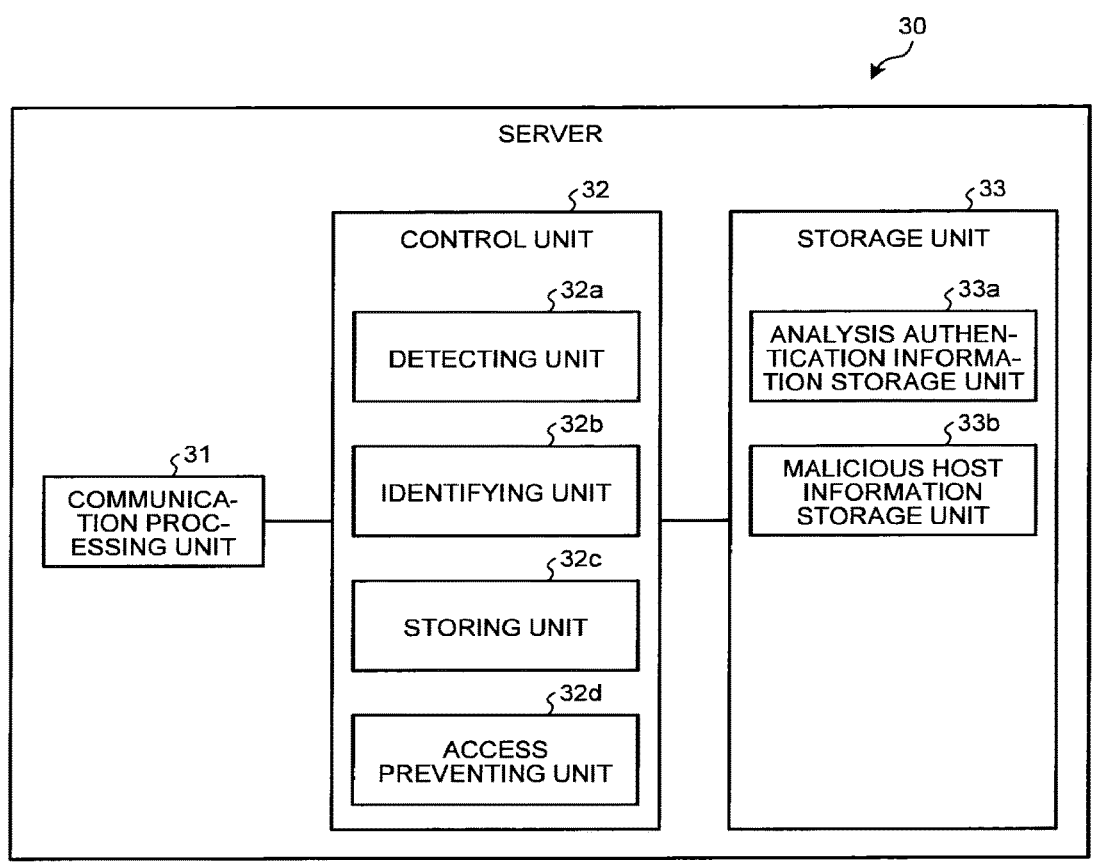
FIG. 5 is a block diagram illustrating a configuration of a server according to the first embodiment.

Next, a configuration of the server 30 illustrated in FIG. 5 will be described. FIG. 5 is a block diagram illustrating the configuration of the server according to the first embodiment. As illustrated in FIG. 5, the server 30 has a communication processing unit 31, a control unit 32, and a storage unit 33.

The communication processing unit 31 controls communication related to various types of information exchanged with the authentication information management device 10, the analyzing host 20, and the like, which are connected thereto. For example, the communication processing unit 31 transmits, to the authentication information management device 10, authentication information used in unauthorized access. Further, the communication processing unit 31 receives analysis authentication information from the authentication information management device 10. The received analysis authentication information is stored in an analysis authentication information storage unit 33a.

The storage unit 33 has, as illustrated in FIG. 5, the analysis authentication information storage unit 33a and a malicious host information storage unit 33b. The storage unit 33 is, for example: a semiconductor memory element, such as a random access memory (RAM) or a flash memory; or a storage device, such as a hard disk or an optical disk.

The analysis authentication information storage unit 33a stores therein a list of authentication information for analysis generated by the above described authentication information management device 10. The list of authentication information stored in the analysis authentication information storage unit 33a is used by a detecting unit 32a, which will be described later, for determining whether or not a login is unauthorized access.

For example, the analysis authentication information storage unit 33a stores therein, as the authentication information used in analysis, site information of a service, an account name, a password, and the like. The site information of a service is, for example, information related to the server 30 that provides a service for monitoring unauthorized access using the authentication information for analysis, and is, for example, an IP address or a fully qualified domain name (FQDN).

Further, the analysis authentication information storage unit 33a stores therein, as the account name, one which is not being used in real services, for example. Further, the analysis authentication information storage unit 33a stores therein, as the password, a character string, which is difficult to be guessed and sufficiently complex. This is for discriminating a login from a login attack by brute force when whether the password is the leaked information is identified upon the login.

The malicious host information storage unit 33b stores therein information on a host that has performed unauthorized access. For example, the malicious host information storage unit 33b stores therein, as the information on a host that has performed unauthorized access, the IP address.

Returning to FIG. 5, the control unit 32 has the detecting unit 32a, an identifying unit 32b, a storing unit 32c, and an access preventing unit 32d. The control unit 32 is an electronic circuit, such as a central processing unit (CPU) or a micro processing unit (MPU), or an integrated circuit, such as an application specific integrated circuit (ASIC) or a field programmable gate array (FPGA).

The detecting unit 32a detects access to a content using the authentication information generated by the generating unit 12a of the authentication information management device 10. Specifically, the detecting unit 32a determines whether the authentication information used in the access to the content coincides with the authentication information stored in the analysis authentication information storage unit 33a.

If access using the authentication information is detected by the detecting unit 32a, the identifying unit 32b identifies the access as unauthorized access. For example, if a login event occurs with respect to a content, for which an analysis account corresponding to the analysis authentication information has been prepared, the identifying unit 32b determines whether the authentication information used in the login is included in the analysis authentication information stored in the analysis authentication information storage unit 33a.

As a result, if the authentication information used in the login is included in the list of analysis authentication information stored in the analysis authentication information storage unit 33a, the identifying unit 32b identifies the login as unauthorized access and transmits the authentication information used in the unauthorized access to the authentication information management device 10.

The storing unit 32c obtains information on a host that has performed the access identified as the unauthorized access by the identifying unit 32b and stores the information into the malicious host information storage unit 33b. Further, the storing unit 32c transmits the obtained information on the host to the unauthorized access information management device 40.

The access preventing unit 32d detects access from the host identified by the information on the host stored in the malicious host information storage unit 33b and prevents access from the host. For example, the access preventing unit 32d determines whether or not the host attempting a login is included in attacker host information, and if as a result of the determination, the host is included in the attacker host information, the access preventing unit 32d determines the login to be a login by an attacker and blocks the login.

Figure 6:
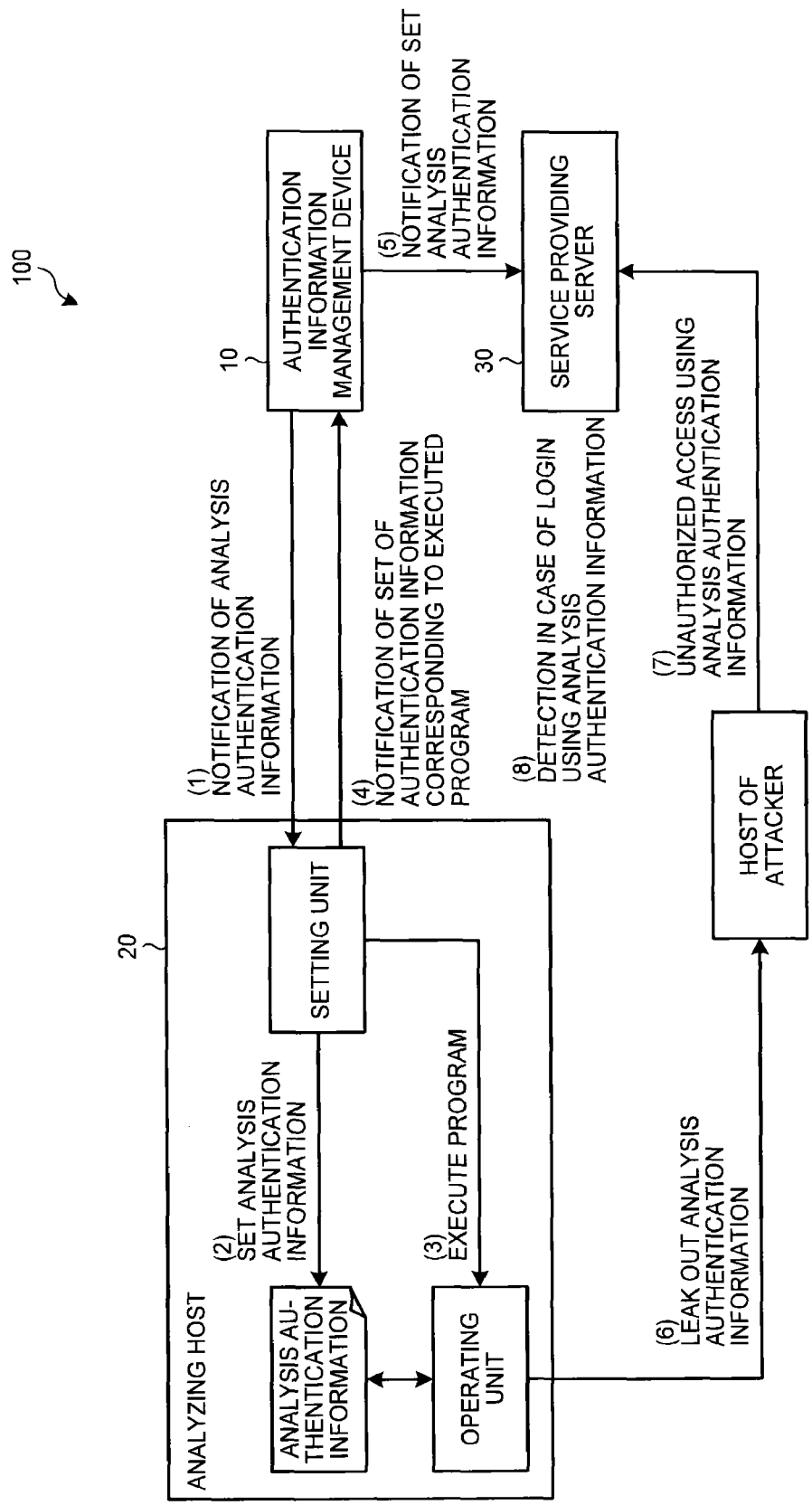
FIG. 6 is a diagram illustrating an information leakage detecting process using authentication information in the unauthorized access detecting system according to the first embodiment.

By use of FIG. 6, an information leakage detecting process using authentication information in the unauthorized access detecting system 100 according to the first embodiment will be described. FIG. 6 is a diagram illustrating the information leakage detecting process using authentication information in the unauthorized access detecting system according to the first embodiment. As illustrated in FIG. 6, the authentication information management device 10 of the unauthorized access detecting system 100 generates, every time a program is analyzed, unique analysis authentication information (a set of a server name that provides a service, an account name, and password information) (see (1) in FIG. 6).

The generated analysis authentication information is set on the analyzing host 20 that executes the program (see (2) in FIG. 6) and the program to be analyzed is executed (see (3) in FIG. 6). Further, the analyzing host 20 notifies the authentication information management device 10 of the set of authentication information corresponding to the executed program (see (4) in FIG. 6). The authentication information management device 10 notifies the server 30 that provides a service, of the generated analysis authentication information (see (5) in FIG. 6).

Thereafter, after the program to be analyzed is executed, the analyzing host 20 transmits the set analysis authentication information to an attacker, if the program is malware that leaks out information (see (6) in FIG. 6). There is no need to identify whether the program has leaked out information at this point. The attacker performs unauthorized access to the service by using the leaked authentication information and attempts login (see (7) in FIG. 6). The server 30 that provides the service identifies whether the login is login using the analysis authentication information, and if the login is the login using the analysis authentication information, the login is detected as unauthorized access (see (8) in FIG. 6). By obtaining and storing information on a host that has performed the unauthorized access, the information on the host is made a target to be filtered in various services.

[Configuration of Unauthorized Access Information Management Device]

Figure 7:
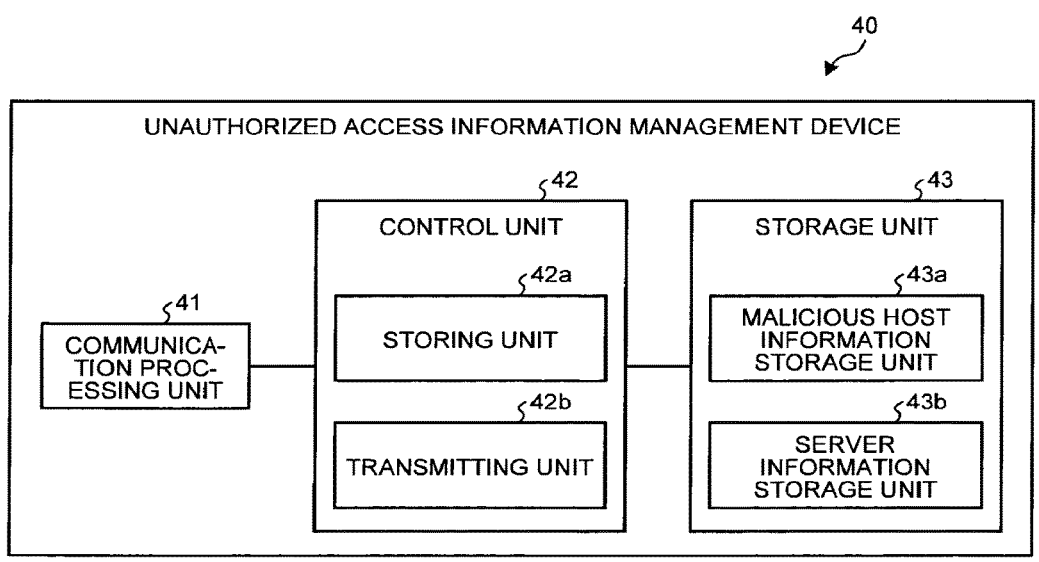
FIG. 7 is a block diagram illustrating a configuration of an unauthorized access information management device according to the first embodiment.

Next, a configuration of the unauthorized access information management device 40 illustrated in FIG. 7 will be described. FIG. 7 is a block diagram illustrating a configuration of the unauthorized access information management device according to the first embodiment. As illustrated in FIG. 7, the unauthorized access information management device 40 has a communication processing unit 41, a control unit 42, and a storage unit 43.

The communication processing unit 41 controls communication related to various types of information exchanged with the authentication information management device 10, the analyzing host 20, the server 30, and the like, which are connected thereto. For example, the communication processing unit 31 receives, from the server, information on a host that has performed unauthorized access. Further, the communication processing unit 41 transmits the information on a host that has performed unauthorized access, to the group of servers 30A to 30C.

The storage unit 43, has, as illustrated in FIG. 7, a malicious host information storage unit 43a and a server information storage unit 43b. The storage unit 43 is, for example: a semiconductor memory element, such as a random access memory (RAM) or a flash memory; or a storage device, such as a hard disk or an optical disk.

The malicious host information storage unit 43a stores therein a list of information on hosts that have performed unauthorized access (which may, hereinafter, be referred to as "attacker host information list"). For example, the malicious host information storage unit 43a stores therein, as the list of information on hosts that have performed unauthorized access, the IP addresses. The information stored therein is a list of host information collected from the group of servers 30A to 30C.

The server information storage unit 43b stores therein address information or the like of a server to be notified of the information on a host that has performed unauthorized access. The information stored therein is referred to by a transmitting unit 42b, which will be described later, when the transmitting unit 42b transmits the information on a host that has performed unauthorized access, to the server 30.

Returning to FIG. 7, the control unit 42 has a storing unit 42a and the transmitting unit 42b. The control unit 42 is an electronic circuit, such as a central processing unit (CPU) or a micro processing unit (MPU), or an integrated circuit, such as an application specific integrated circuit (ASIC) or a field programmable gate array (FPGA).

The storing unit 42a receives the information on a host that has made unauthorized access, the information being transmitted from the server 30, and stores the information on the host that has made unauthorized access, into the malicious host information storage unit 43a. For example, as the information on a host that has made unauthorized access, the storing unit 42a stores the IP address into the malicious host information storage unit 43a and updates the attacker host information list.

The attacker host information list, which is able to be collected when unauthorized access is identified in a service by use of analysis authentication information, is applicable to real services using various types of authentication information. For an intracompany system or a service with limited users, by limiting IP addresses or the like of hosts, unauthorized access due to account information leakage is able to be prevented to a certain extent. For example, in an intracompany system, protection is possible by allowing only login from intracompany IP addresses. However, since a vast number of hosts that perform login exist for a service used by an unspecified large number of users and the IP addresses are scattered, measures by limiting the IP addresses of the users beforehand are unable to be taken. This embodiment may be applied to the latter service used by an unspecified large number of users, for example, a mail service, an internet shopping service, a social network service, a blog service, or the like.

The transmitting unit 42b transmits, to the respective servers 30A to 30C, the information on a host that has made unauthorized access. For example, the transmitting unit 42b refers to the address information of the server 30 stored in the server information storage unit 43b and transmits the information on the host that has made unauthorized access to the respective servers 30A to 30C.

Figure 8:
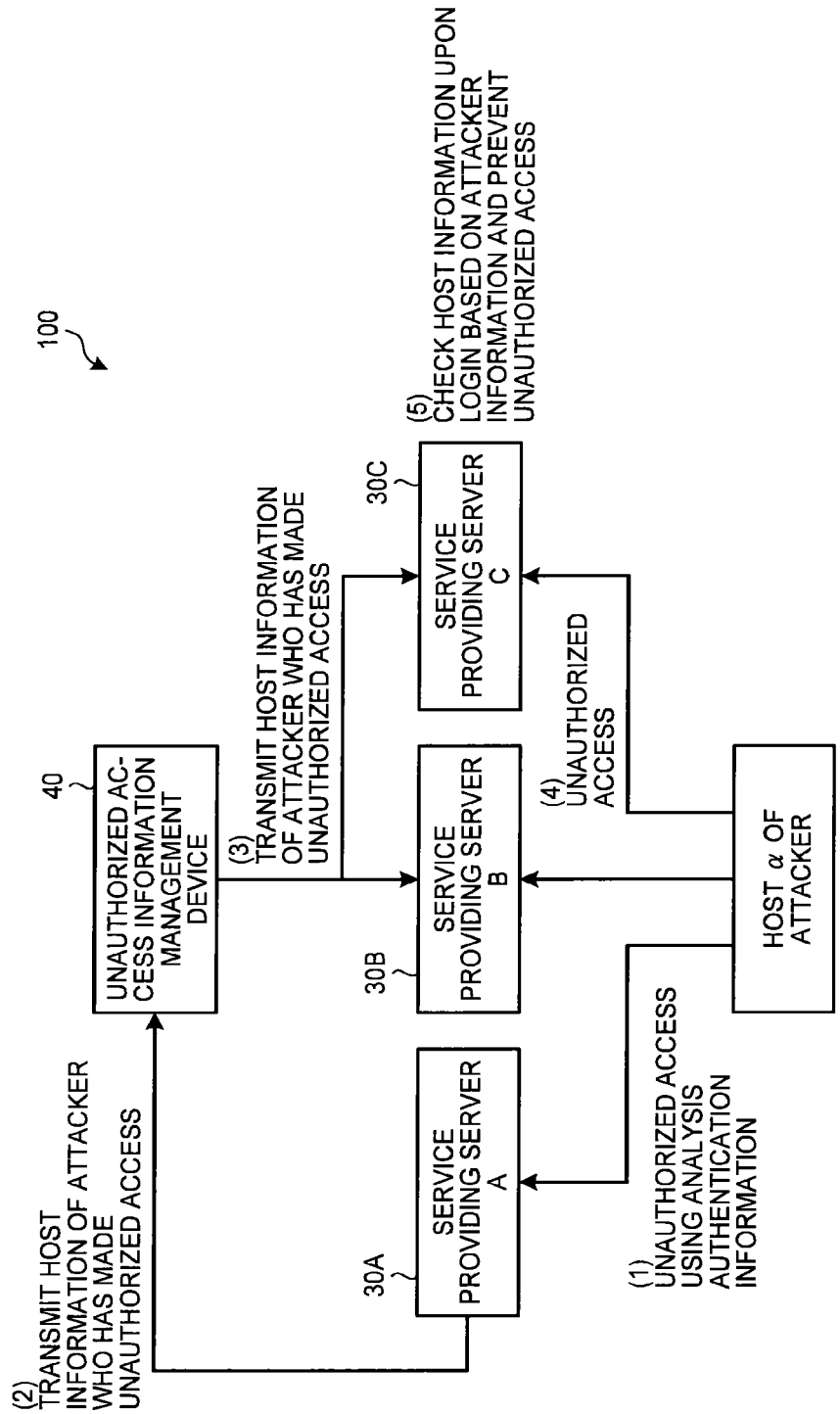
FIG. 8 is a diagram illustrating a process upon filtering a host of an attacker performing unauthorized access in the unauthorized access detecting system according to the first embodiment.

By use of FIG. 8, a process upon filtering a host of an attacker that performs unauthorized access will be described. FIG. 8 is a diagram illustrating the process upon filtering a host of an attacker that performs unauthorized access in the unauthorized access detecting system according to the first embodiment. As illustrated in FIG. 8, when the server 30A that provides a service detects unauthorized access using analysis authentication information (see (1) in FIG. 8), the host information of that attacker is transmitted to the unauthorized access information management device 40 (see (2) in FIG. 8).

The unauthorized access information management device 40 transmits, to the other servers (the server 30B and the server 30C), the host information of the attacker that performs unauthorized access (see (3) in FIG. 8). When unauthorized access is received (see (4) in FIG. 8), each of the servers 30A to 30C that have received the information on the attacker identifies the host of the attacker by comparison with the host information upon the login based on that information and prevents the unauthorized access (see (5) in FIG. 8). Plural types of the servers 30 that provide services may be present, or the server 30 may be a single server.

Figure 9:
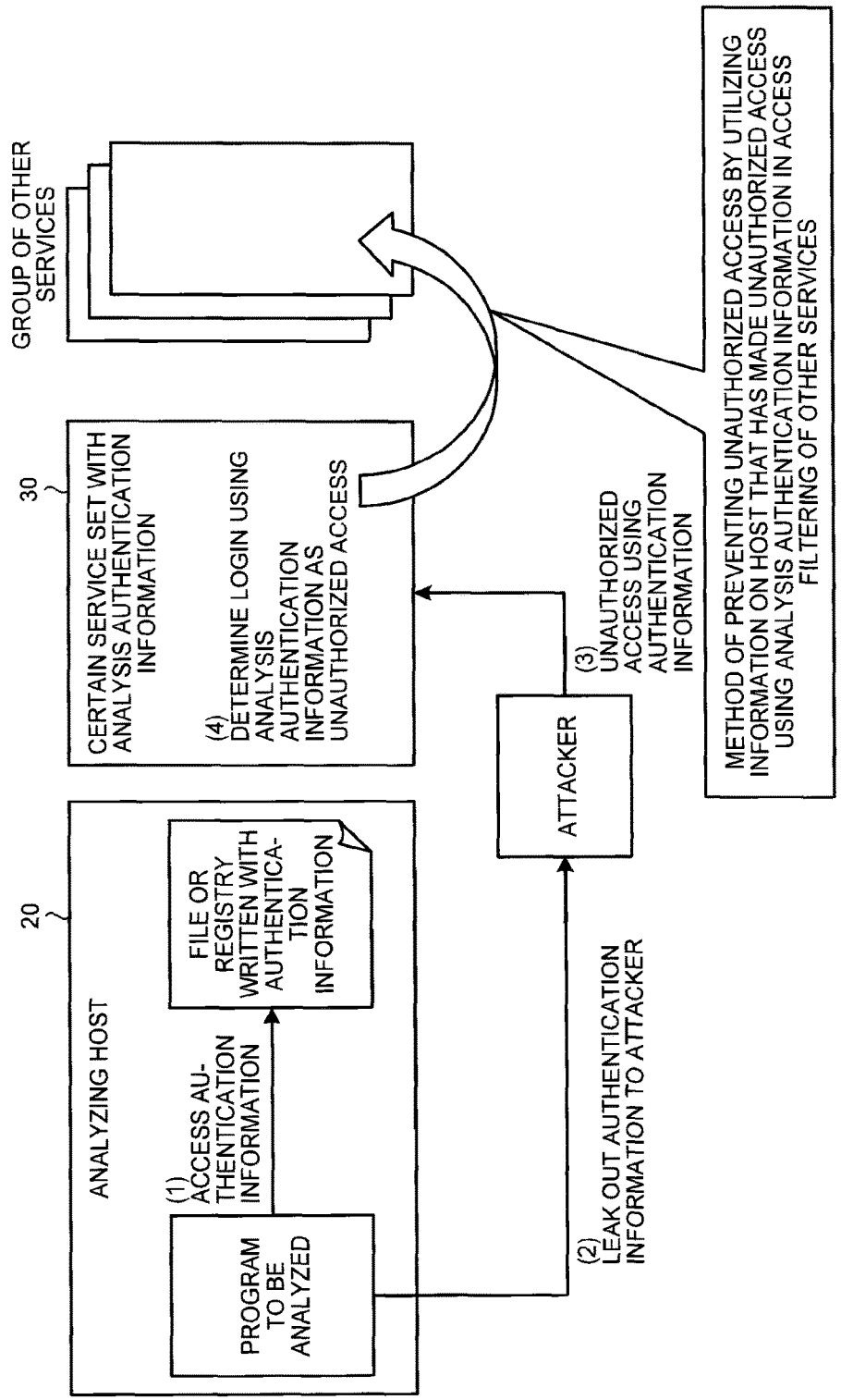
FIG. 9 is a diagram illustrating a process of preventing unauthorized access in the unauthorized access detecting system according to the first embodiment.

By use of FIG. 9, a process of preventing unauthorized access in the unauthorized access detecting system 100 according to the first embodiment will be described. FIG. 9 is a diagram illustrating the process of preventing unauthorized access in the unauthorized access detecting system according to the first embodiment.

As illustrated in FIG. 9, the analyzing host 20 sets, as authentication information of a particular service on the analyzing host 20, the authentication information generated by the authentication information management device 10, and when a program is caused to operate, if the program to be analyzed is malware that leaks out information, the analyzing host 20 accesses the file or registry, in which the above described authentication information is stored (see (1)

in FIG. 9). The analyzing host 20 then secretly leaks out the authentication information without the user's consent to an outside attacker (see (2) in FIG. 9).

Next, while the server 30 that provides a particular service is being operated, login is observed. When login by the attacker using the leaked authentication information is performed (see (3) in FIG. 9), the server 30 determines that the login is unauthorized access (see (4) in FIG. 9). By utilizing the information on the host that has made the unauthorized access in access filtering of other services, unauthorized access is able to be prevented.

[Process by Server]

Figure 10:
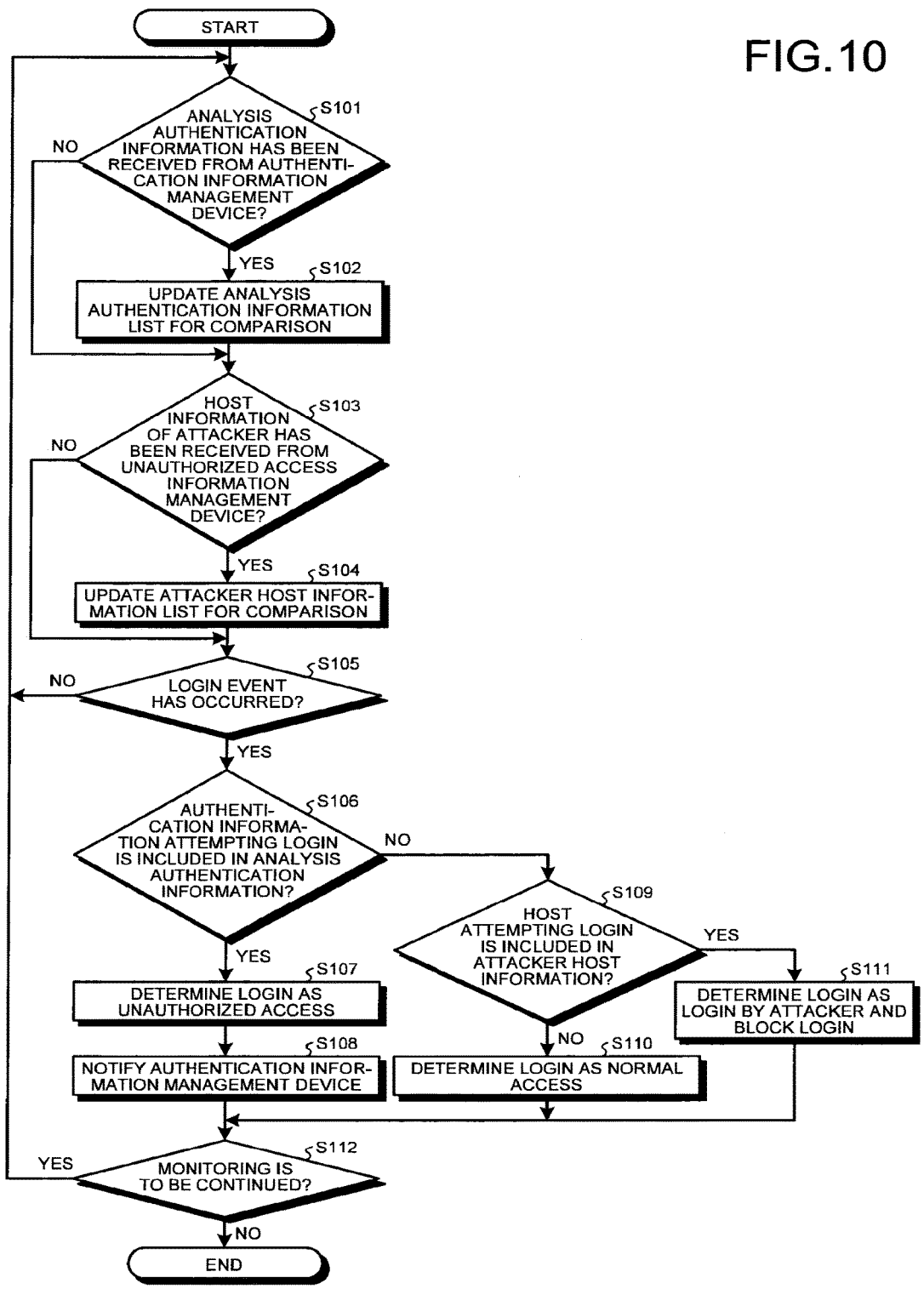
FIG. 10 is a flow chart illustrating a flow of an unauthorized access detecting process in the server of the unauthorized access detecting system according to the first embodiment.

Next, by use of FIG. 10, a process by the server 30 according to the first embodiment will be described. FIG. 10 is a flow chart illustrating a flow of an unauthorized access detecting process in the server of the unauthorized access detecting system according to the first embodiment.

As illustrated in FIG. 10, the communication processing unit 31 of the server 30 determines whether analysis authentication information has been received from the authentication information management device 10 (Step S101). As a result, if the analysis authentication information has not been received from the authentication information management device 10 (Step S101: No), the process is advanced to processing of Step S103. Further, if the analysis authentication information has been received from the authentication information management device 10 (Step S101: Yes), the communication processing unit 31 updates a list of analysis authentication information for comparison stored in the analysis authentication information storage unit 33a (Step S102).

The storing unit 32c then determines whether host information of an attacker has been received from the unauthorized access information management device 40 (Step S103). As a result, if the host information on an attacker has not been received from the unauthorized access information management device 40 (Step S103: No), the process is advanced to processing of Step S105. Further, if the host information of an attacker has been received from the unauthorized access information management device 40 (Step S103: Yes), the storing unit 32c updates the attacker host information list for comparison by storing the host information into the malicious host information storage unit 33b (Step S104).

The detecting unit 32a then determines whether or not a login event has occurred with respect to a content, for which an analysis account corresponding to the analysis authentication information has been prepared (Step S105). As a result, if no login event has occurred (Step S105: No), the process is returned to the processing of Step S101. Further, if a login event has occurred (Step S105: Yes), the detecting unit 32a determines whether the authentication information used in the login is included in the analysis authentication information stored in the analysis authentication information storage unit 33a (Step S106).

As a result, if the authentication information used in the login is included in the analysis authentication information stored in the analysis authentication information storage unit 33a (Step S106: Yes), the identifying unit 32b determines the login to be of unauthorized access (Step S107). Subsequently, the identifying unit 32b notifies the authentication information management device 10 of the authentication information used in the unauthorized access (Step S108), and the process is advanced to processing of Step S112.

Further, at Step S106, if the authentication information used in the login is not included in the analysis authentication information stored in the analysis authentication information storage unit 33a (Step S106: No), the access preventing unit 32d determines whether the host attempting the login is included in the attacker host information (Step S109). As a result, if it is determined that the host attempting the login is not included in the attacker host information (Step S109: No), the login is determined to be of normal access (Step S110) and the process is advanced to processing of Step S112. If it is determined that the host attempting the login is included in the attacker host information (Step S109: Yes), the access preventing unit 32d determines the login to be login by an attacker and blocks the login (Step S111), and the process is advanced to processing of Step S112.

At Step S112, the detecting unit 32a determines whether or not monitoring of unauthorized access is to be continued (Step S112). As a result, if it is determined that the monitoring of unauthorized access is to be continued (Step S112: Yes), the process is returned to Step S101. Further, if the detecting unit 32a determines that the monitoring of unauthorized access is not to be continued (Step S112: No), the process is ended.

[Effects of First Embodiment]

As described above, in the unauthorized access detecting system 100 according to the first embodiment, authentication information to be leaked outside is generated, the generated authentication information is set on a host, and a program to be analyzed is operated on the host. In the unauthorized access detecting system 100, access to a content using the authentication information is detected, and if the access using the authentication information is detected, the access is identified as unauthorized access. Therefore, detection and protection from unauthorized access using leaked authentication information are able to be performed properly.

Further, distinction between an authorized user and an attacker has been difficult in an invasion detection system when the attacker has performed unauthorized access to various services using authentication information obtained by information leakage, but in the unauthorized access detecting system 100, since the leaked information itself is for analysis and will not be used by general users, as the leaked information is used, the use is identifiable as unauthorized access, and a host of the attacker that has made that unauthorized access is able to be identified. Since the host of this attacker is likely to be making unauthorized access to other various services, by filtering information on this host (for example, the IP address) in other various services, unauthorized access is able to be detected and prevented.

[Second Embodiment]

Although the case, in which unauthorized access using leaked authentication information is detected, has been described in the first embodiment, the embodiment is not limited to this case. For example, malware that leaks out information may be identified. Therefore, hereinafter, as a second embodiment, an example of a case, in which an unauthorized access detecting system detects unauthorized access to a content using authentication information, and identifies, if unauthorized access using the authentication information is detected, a program operating on a host set with the authentication information as a program that leaks out information, will be described.

[Configuration of System]

Figure 11:
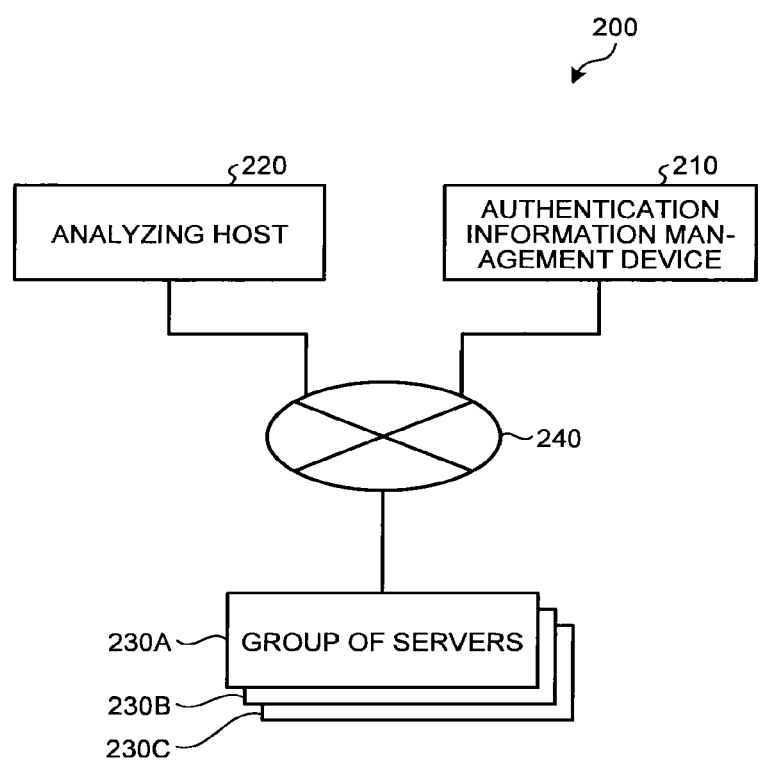
FIG. 11 is a diagram illustrating an example of a configuration of an unauthorized access detecting system according to a second embodiment.

First, an example of a configuration of an unauthorized access detecting system 200 according to the second embodiment will be described. FIG. 11 is a diagram illustrating the example of the configuration of the unauthorized access detecting system according to the second embodiment. As illustrated in FIG. 11, the unauthorized access detecting system 200 has an authentication information management device 210, an analyzing host 220, and a group of servers 230A to 230C. Further, in the unauthorized access detecting system 200, the authentication information management device 210, the analyzing host 220, and the group of servers 230A to 230C are connected to one another via the Internet 240. As for the group of servers 230A to 230C, if one of the servers is described without any particular distinction among them, that server will be referred to as "server 230".

The authentication information management device 210 generates authentication information for analysis and manages correspondence between the generated authentication information and a program to be set with the authentication information. Further, the authentication information management device 210 performs transmission to the analyzing host 220. The generated authentication information corresponds to each of the servers 30A and 30C and as the authentication information, site information of a service, an account name, and a password are generated. The site information of a service is information on a server that provides a service for monitoring unauthorized access using authentication information for analysis, and is, for example, an IP address or FQDN of the group of servers 30A to 30C. Further, the account name and password are randomly generated, and those that are not being actually used are generated.

Further, if authentication information used in unauthorized access is received from the group of servers 230A to 230C, the authentication information management device 210 identifies a program corresponding to the received authentication information to be a program that leaks out information.

The analyzing host 220 sets authentication information of a particular service on the analyzing host 220 and operates a program to be analyzed. The analyzing host 220 is connected to the Internet 240 in advance. If the program is malware that leaks out information, the program will secretly leak out authentication information to an outside attacker without consent of a user.

The group of servers 230A to 230C are servers that manage contents of a Web site and are servers for causing an attacker to fraudulently make access with the authentication information intentionally leaked out. For example, if there is access in which the leaked authentication information is used, the group of servers 230A to 230C identify that access to be unauthorized access, and notify the authentication information management device 210 of the used authentication information.

Figure 12:
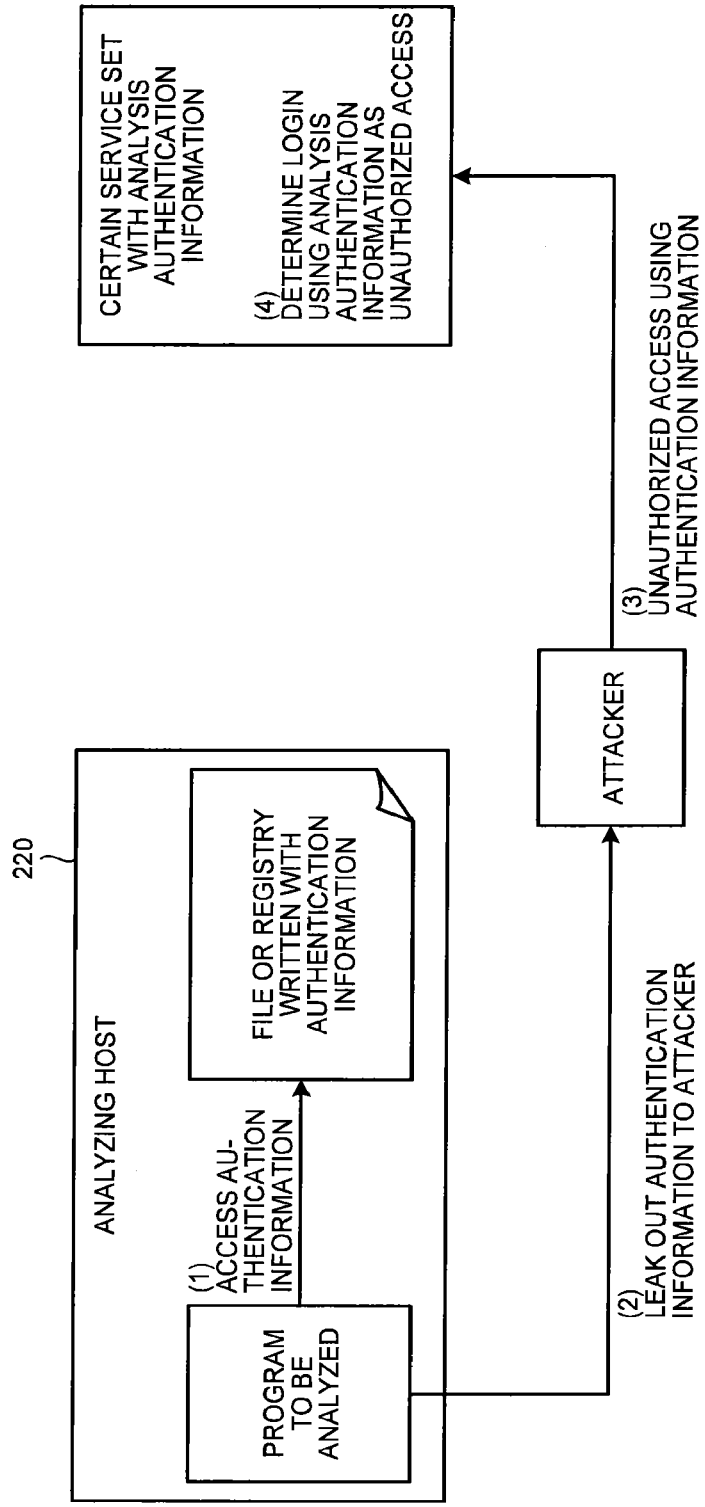
FIG. 12 is a diagram illustrating a process of leaking out analysis authentication information and a process of monitoring unauthorized access in a service set with the analysis authentication information, in the unauthorized access detecting system according to the second embodiment.

In the unauthorized access detecting system 200, as a premise, a process of monitoring unauthorized access is performed by causing authentication information for analysis to be intentionally leaked out. By use of FIG. 12, a process of leaking out analysis authentication information and a process of monitoring unauthorized access in a service set with the analysis authentication information will be described. FIG. 12 is a diagram illustrating a process of leaking out analysis authentication information and a process of monitoring unauthorized access in a service set with the analysis authentication information, in the unauthorized access detecting system according to the second embodiment.

First, as illustrated in FIG. 12, the analyzing host 220 sets, as authentication information of a particular service on the analyzing host, the authentication information generated by the authentication information management device 210, and when a program is operated, if the program to be analyzed is malware that leaks out information, the analyzing host 220 accesses a file or a registry, in which the above described authentication information has been stored (see (1) in FIG. 12). The analyzing host 220 then secretly leaks out the authentication information without the user's consent to an outside attacker (see (2) in FIG. 12).

Next, while the group of servers 230A to 230C providing a particular service are being operated, login is observed. If login by the attacker using the leaked authentication information is made (see (3) in FIG. 12), the group of servers 230A to 230C determine that the login is of unauthorized access (see (4) in FIG. 12).

Accordingly, by intentionally leaking out authentication information for analysis, as the same leaked authentication information is used, that use is able to be identified as unauthorized access. A program corresponding to the authentication information used in the unauthorized access is then identified as a program that leaks out information.

[Configuration of Authentication Information Management Device]

Figure 13:
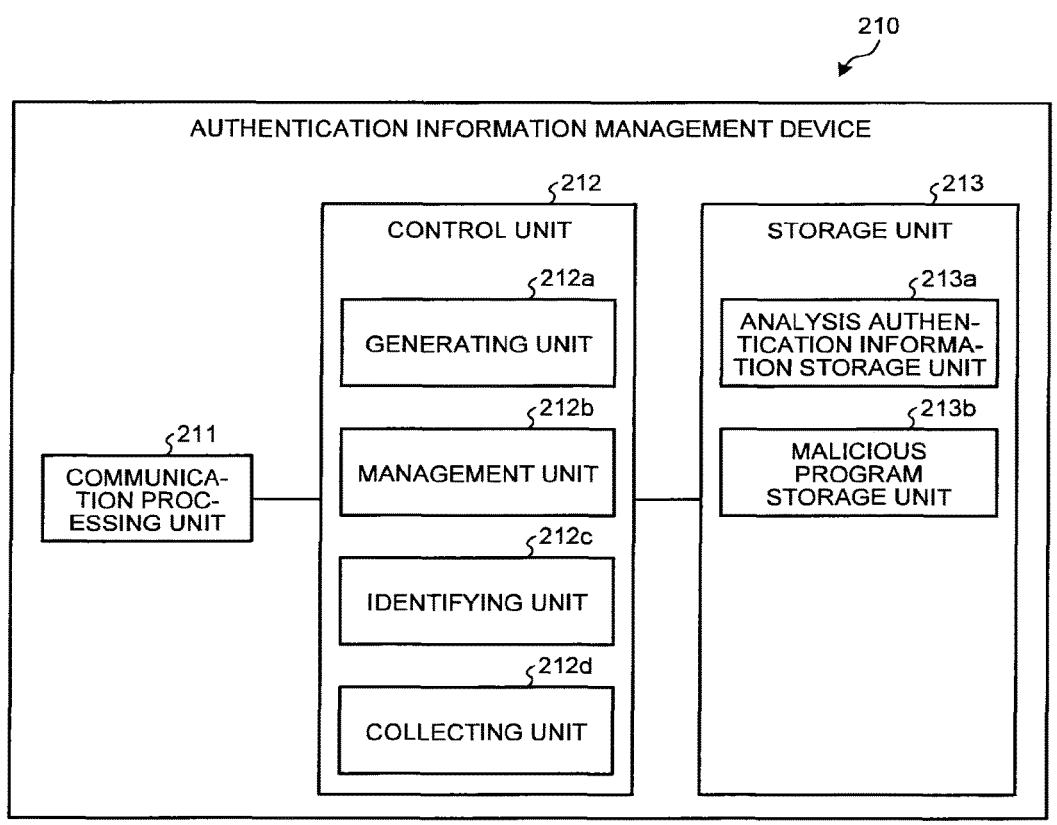
FIG. 13 is a block diagram illustrating a configuration of an authentication information management device according to the second embodiment.

Next, a configuration of the authentication information management device 210 illustrated in FIG. 13 will be described. FIG. 13 is a block diagram illustrating the configuration of the authentication information management device according to the second embodiment. As illustrated in FIG. 13, the authentication information management device 210 has a communication processing unit 211, a control unit 212, and a storage unit 213.

The communication processing unit 211 controls communication related to various types of information exchanged with the analyzing host 220, the group of servers 230A to 230C, and the like, which are connected thereto. For example, the communication processing unit 211 transmits the generated authentication information to the analyzing host 220. Further, for example, the communication processing unit 211 receives authentication information used in unauthorized access, from the group of servers 230A to 230C.

The storage unit 213, has, as illustrated in FIG. 13, an analysis authentication information storage unit 213a and a malicious program storage unit 213b. The storage unit 213 is, for example: a semiconductor memory element, such as a random access memory (RAM) or a flash memory; or a storage device, such as a hard disk or an optical disk.

The analysis authentication information storage unit 213a stores therein a table prescribing correspondence between authentication information for analysis generated by a generating unit 212a, which will be described later, and a program set with the authentication information. For example, the analysis authentication information storage unit 213a stores therein, as exemplified in FIG. 14, "Analyzed Program", which is information identifying a program to be analyzed, "Client Application", which indicates a type of application operated on the analyzing host 220, and "Authentication Information", which is information identifying the generated authentication information, in association with one another.

For example, as the authentication information used in analysis, the analysis authentication information storage unit 213a stores therein site information of a service, an account name, a password, and the like. The site information of a service is, for example, information related to the group of servers 230A to 230C that provide a service for monitoring unauthorized access using the authentication information for analysis, and is, for example, an IP address or a fully qualified domain name (FQDN).

Further, the analysis authentication information storage unit 213a stores therein, as the account name, for example, one that is not being used in real services. Further, the analysis authentication information storage unit 213a stores therein, as the password, a character string, which is difficult to be guessed and sufficiently complex. This is for discriminating a login from a login attack by brute force when whether the password is the leaked information is identified upon the login.

The malicious program storage unit 213b stores therein information identifying a malicious program that leaks out information. Specifically, the malicious program storage unit 213b stores therein information identifying the malicious program identified by an identifying unit 212c described later.

Returning to FIG. 13, the control unit 212 has the generating unit 212a, a management unit 212b, the identifying unit 212c, and a collecting unit 212d. The control unit 212 is an electronic circuit, such as a central processing unit (CPU) or a micro processing unit (MPU), or an integrated circuit, such as an application specific integrated circuit (ASIC) or a field programmable gate array (FPGA).

The generating unit 212a generates authentication information to be leaked outside. For example, the generating unit 212a generates, as the authentication information for analysis to be intentionally leaked out to an attacker, a set of: an IP address or FQDN of the group of servers 230A to 330C; and an account name and a password that are randomly generated. The generated authentication information may correspond to various types of services, for example, those of Secure Shell (SSH), File Transfer Protocol (FTP), Post Office Protocol (POP), and the like.

In order to accurately distinguish between brute force login (login attempted by an attacker using all possible combinations of account names and passwords) and login using the leaked authentication information, with respect to the service in the server 230 providing the service, the generated analysis authentication information is desirably a character string, which is randomly generated, sufficiently long, and unique.

The management unit 212b transmits the authentication information generated by the generating unit 212a to the analyzing host 220. The transmitted authentication information is set on the analyzing host 220 and a program to be analyzed is executed. Further, the management unit 212b receives a set of authentication information corresponding to the program executed by the analyzing host 220 and stores the program correspondingly with the set of authentication information corresponding to the program, into the analysis authentication information storage unit 213a.

If unauthorized access using the authentication information is detected by a later described detecting unit 232a of the server 230, the identifying unit 212c identifies the program operating on the analyzing host 220 set with the authentication information to be a program that leaks out information. For example, when the authentication information used in the unauthorized access is received from the group of servers 230A to 230C, the identifying unit 212c refers to the table stored in an analysis authentication information storage unit 233a, obtains a program corresponding to the authentication information, and identifies the program to be a program that leaks out information.

The collecting unit 212d collects the same program as the program identified by the identifying unit 212c from a Web space. For example, the collecting unit 212d may perform the collection by using a Web client honeypot of an existing technique and patrolling the Web space. A Web client honeypot is, not only able to collect programs automatically downloaded and installed by vulnerability of a Web browser being attacked, but even also able to collect programs, for which a user needs to click dialogs in pop-ups or the like to download and install the programs, by imitating user interaction. In particular, such programs, for which a user needs to click dialogs to download and install the programs, include both genuine and malicious programs, and thus based on whether information is leaked, whether a program is malware is able to be identified.

[Configuration of Analyzing Host]

Figures 14, 15:
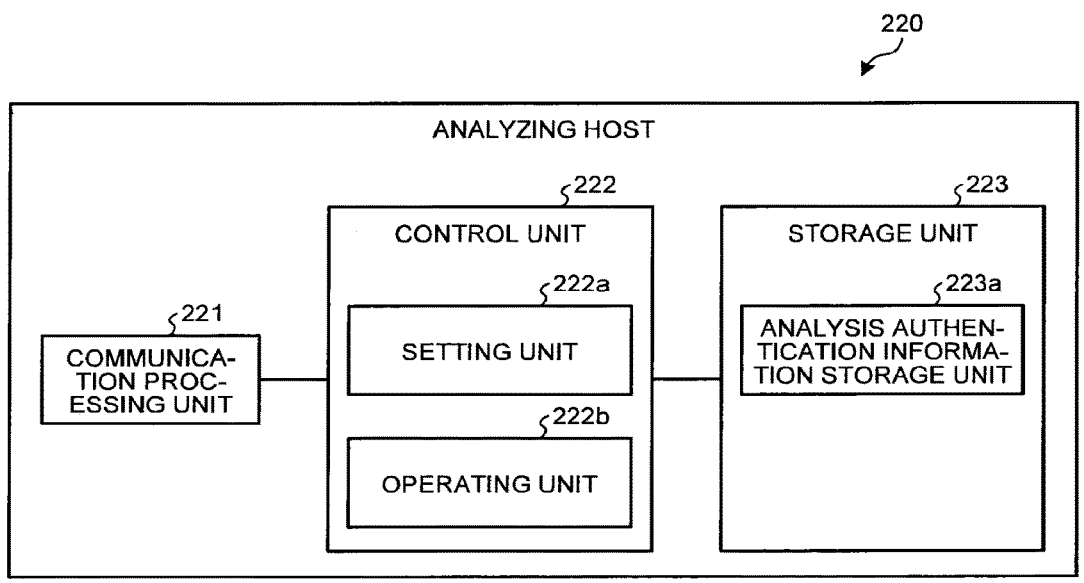
FIG. 14 is a diagram illustrating an example of a table stored in an analysis authentication information storage unit.
FIG. 15 is a block diagram illustrating a configuration of an analyzing host according to the second embodiment.

Next, a configuration of the analyzing host 220 illustrated in FIG. 15 will be described. FIG. 15 is a block diagram illustrating the configuration of the analyzing host according to the second embodiment. As illustrated in FIG. 15, the analyzing host 220 has a communication processing unit 221, a control unit 222, and a storage unit 223.

The communication processing unit 221 controls communication related to various types of information exchanged with the authentication information management device 210, the group of servers 230A to 230C, and the like, which are connected thereto. For example, the communication processing unit 221 receives authentication information from the authentication information management device 210. Further, for example, the communication processing unit 221 transmits authentication information to an outside attacker. If authentication information is received from the authentication information management device 210, the received authentication information is stored in an analysis authentication information storage unit 223a described later.

A storage unit 233 has, as illustrated in FIG. 15, the analysis authentication information storage unit 223a. The storage unit 223 is, for example: a semiconductor memory element, such as a random access memory (RAM) or a flash memory; or a storage device, such as a hard disk or an optical disk.

The analysis authentication information storage unit 223a stores therein the above described authentication information for analysis generated by the authentication information management device 210. For example, the analysis authentication information storage unit 223a stores therein, as the authentication information used in analysis, site information of a service, an account name, a password, and the like. The site information of a service is, for example, information related to the group of servers 230A to 230C that provide a service for monitoring unauthorized access using the authentication information for analysis, and is, for example, an IP address or a fully qualified domain name (FQDN).

Further, the analysis authentication information storage unit 223a stores therein, as the account name, one that is not being used in real services, for example. Further, the analysis authentication information storage unit 223a stores therein, as the password, a character string, which is difficult to be guessed and sufficiently complex. This is for discriminating a login from a login attack by brute force when whether the password is the leaked information is identified upon the login.

Returning to FIG. 15, the control unit 222 has a setting unit 222a and an operating unit 222b. The control unit 222 is an electronic circuit, such as a central processing unit (CPU) or a micro processing unit (MPU), or an integrated circuit, such as an application specific integrated circuit (ASIC) or a field programmable gate array (FPGA).

The setting unit 222a sets, as authentication information of a particular service, the authentication information generated by the generating unit 212a of the authentication information management device 210. For example, the setting unit 222a obtains authentication information from the analysis authentication information storage unit 223a and sets the obtained authentication information as the authentication information of the particular service.

The operating unit 222b operates a client application (of SSH, FTP, POP, or the like) of a service, as a program to be analyzed, on the analyzing host 220 set with the authentication information by the setting unit 222a. The operating unit 222b performs notification of the set of authentication information corresponding to the executed program. If the operated program is malware that leaks out information, the program will secretly leak out the authentication information to an outside attacker without consent of a user. The authentication information to be leaked out may be of any type of service as long as whether there has been a login with the authentication information leaked out by the server 230 providing the service is able to be checked. Further, the service may be prepared for the analysis, or a real service may be used.

Further, if a client application of a service operates on the analyzing host 220, it is supposed that the client application will write authentication information into a file or a registry. The stored path and format for this setup file or registry by each client application are determined beforehand, and thus authentication information is written into the file or registry according thereto.

If a program to be analyzed is malware that leaks out information, the program will access the file or registry, in which the above described authentication information has been stored, and transmit that information to outside. The authentication information may be set in a file or registry of a single particular client application for each host, or may be set in files or registries of plural client applications simultaneously. If analysis information is simultaneously set for plural client applications, analysis authentication information corresponding to the number of types of the set client applications need to be generated.

Figure 16:
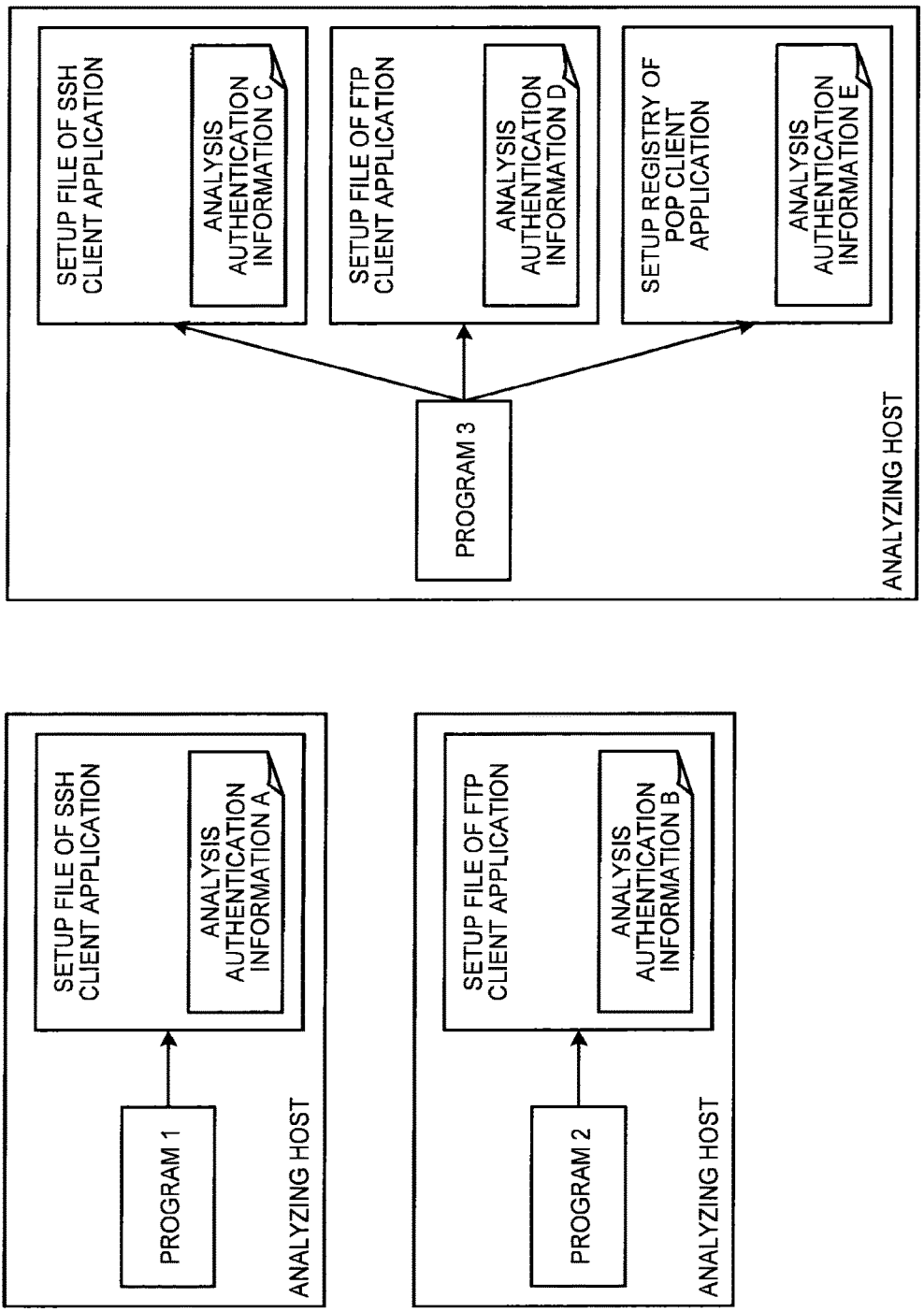
FIG. 16 is a diagram illustrating an analyzing process using a single type and plural types of authentication information.

For example, as exemplified in FIG. 16, in an example of setting authentication information in a file or registry of a single particular client application, the analyzing host 220 sets "Analysis Authentication Information A" in "Setup File of SSH Client Application" and causes "Program 1" to operate. Or, a different analyzing host 220 sets "Analysis Authentication Information B" in "Setup File of FTP Client Application", and causes "Program 2" to operate.

Further, as exemplified in FIG. 16, in an example of simultaneously setting analysis authentication information in files or registries of plural client applications, the analyzing host 220 sets: "Analysis Authentication Information C" in "Setup File of SSH Client Application"; "Analysis Authentication Information D" in "Setup File of FTP Client Application"; and "Analysis Authentication Information E" in "Setup Registry of POP Client Application", and causes "Program 3" to operate.

[Configuration of Server]

Figure 17:
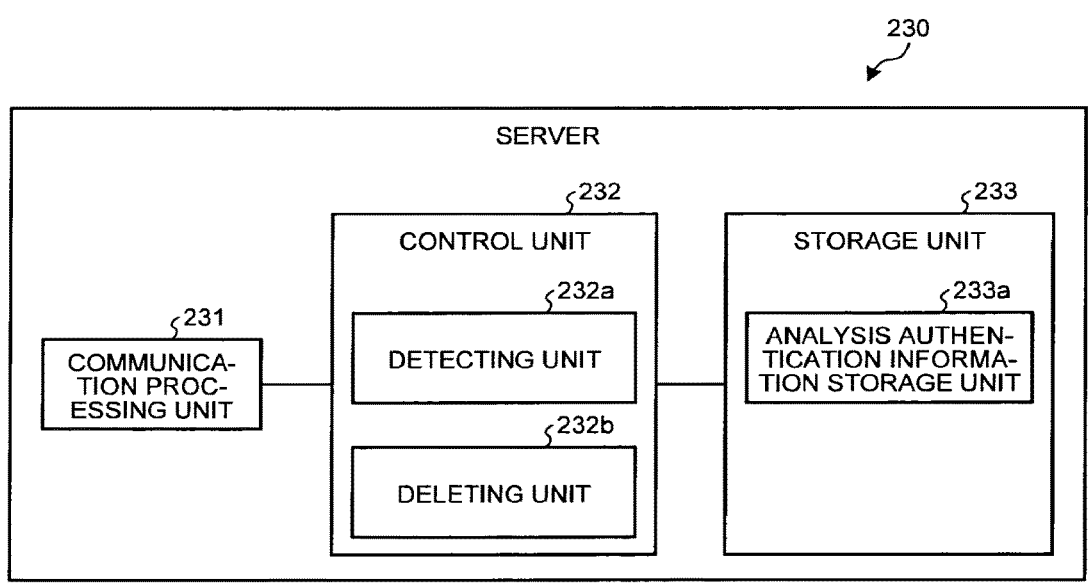
FIG. 17 is a block diagram illustrating a configuration of a server according to the second embodiment.

Next, a configuration of the server 230 illustrated in FIG. 17 will be described. FIG. 17 is a block diagram illustrating the configuration of the server according to the second embodiment. As illustrated in FIG. 17, the server 230 has a communication processing unit 231, a control unit 232, and a storage unit 233.

The communication processing unit 231 controls communication related to various types of information exchanged with the authentication information management device 210, the analyzing host 220, and the like, which are connected thereto. For example, the communication processing unit 231 transmits, to the authentication information management device 210, authentication information used in unauthorized access. Further, the communication processing unit 231 receives analysis authentication information from the authentication information management device 210. The received analysis authentication information is stored in the analysis authentication information storage unit 233a.

The storage unit 233 has, as illustrated in FIG. 17, an analysis authentication information storage unit 233a. The storage unit 233 is, for example: a semiconductor memory element, such as a random access memory (RAM) or a flash memory; or a storage device, such as a hard disk or an optical disk.

The analysis authentication information storage unit 233a stores therein a list of authentication information for analysis generated by the above described authentication information management device 210. The list of authentication information stored in the analysis authentication information storage unit 233a is used by a detecting unit 232a, which will be described later, for determining whether or not a login is of unauthorized access.

For example, the analysis authentication information storage unit 223a stores therein, as the authentication information used in analysis, site information of a service, an account name, a password, and the like. The site information of a service is, for example, information related to the server 230 that provides a service for monitoring unauthorized access using the authentication information for analysis, and is, for example, an IP address or a fully qualified domain name (FQDN).

Further, the analysis authentication information storage unit 233a stores therein, as the account name, one that is not being used in real services, for example. Further, the analysis authentication information storage unit 233a stores therein, as the password, a character string, which is difficult to be guessed and sufficiently complex. This is for discriminating a login from a login attack by brute force when whether the password is the leaked information is identified upon the login.

Returning to FIG. 17, the control unit 232 has a detecting unit 232a and a deleting unit 232b. The control unit 232 is an electronic circuit, such as a central processing unit (CPU) or a micro processing unit (MPU), or an integrated circuit, such as an application specific integrated circuit (ASIC) or a field programmable gate array (FPGA).

The detecting unit 232a detects unauthorized access to a content using the authentication information generated by the generating unit 212a of the authentication information management device 210. Specifically, the detecting unit 232a determines whether the authentication information used in the access to the content coincides with the authentication information stored in the analysis authentication information storage unit 233a, and if they coincide with each other, the detecting unit 232a detects the access as unauthorized access.

For example, if a login event occurs with respect to a content, for which an analysis account corresponding to analysis authentication information has been prepared, the detecting unit 232a determines whether the authentication information used in the login is included in the analysis authentication information stored in the analysis authentication information storage unit 233a.

As a result, if the authentication information used in the login is included in the list of analysis authentication information stored in the analysis authentication information storage unit 233a, the detecting unit 232a determines the login to be of unauthorized access and transmits the authentication information used in the unauthorized access to the authentication information management device 210. Further, if the authentication information used in the login is not included in the list of analysis authentication information stored in the analysis authentication information storage unit 233a, the detecting unit 232a determines the login to be of normal access.

The deleting unit 232b detects a program identified by the identifying unit 212c of the authentication information management device 210 and if the program is detected, the deleting unit 232b deletes the program. Further, for example, if information identifying a program that leaks out information is received from the authentication information management device 210, the deleting unit 232b is able to prohibit execution of the program on the host, as a method of protecting the actual host from damage of information leakage by the program that leaks out information. The program is registered as a file signature of a host-based invasion detection system or antivirus software, and if the file is present on the host or if the file is attempted to be executed, prohibition and deletion thereof are performed.

Further, as a method of preventing an actual host from damage of information leakage, downloading of the program from the network may be prohibited. Monitoring is performed by a network-based invasion detection system, a Web proxy, a mail server, or the like, a file downloaded from an external network is examined, and if the program is included therein, downloading thereof is prohibited.

Figure 18:
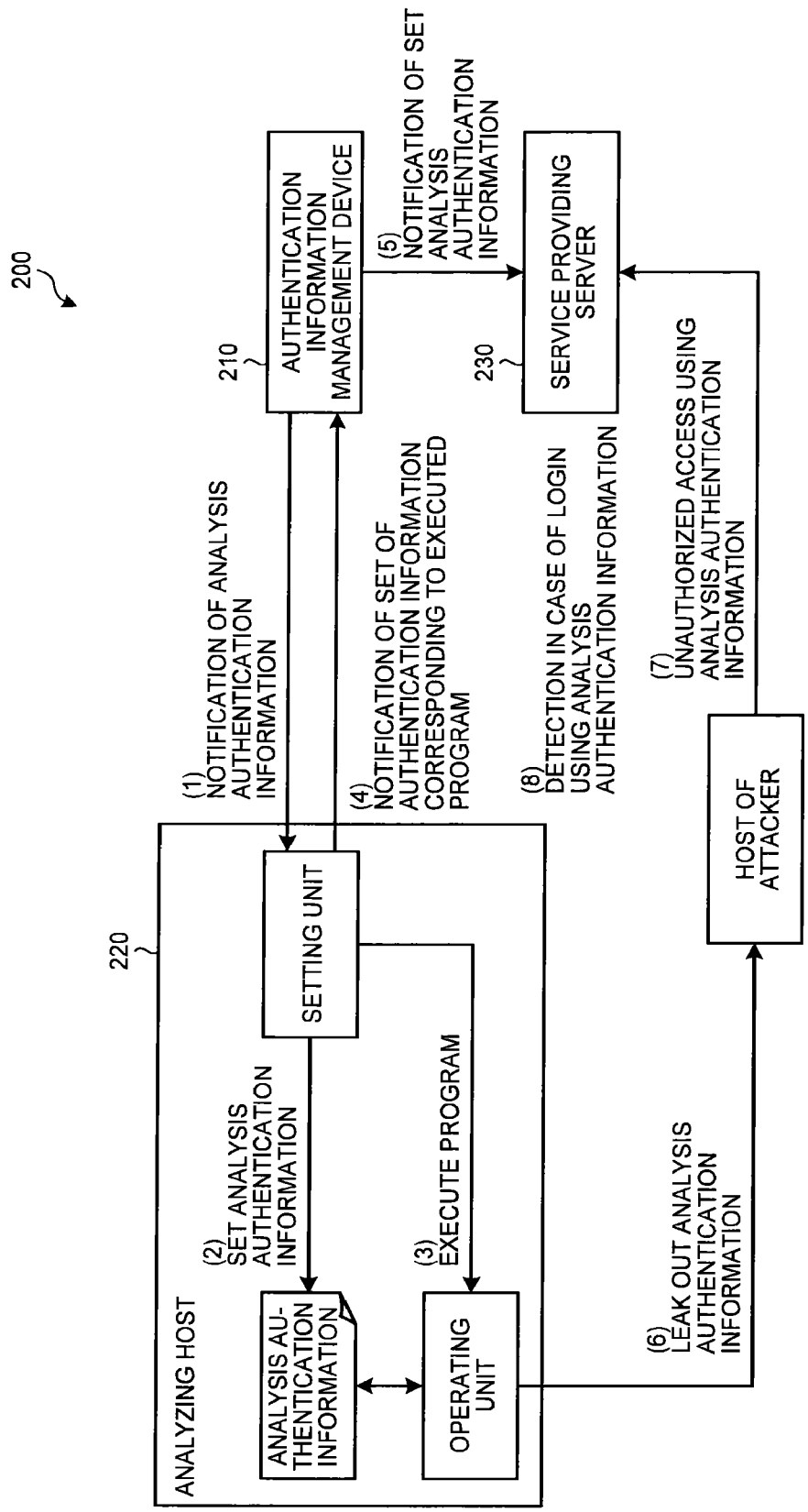
FIG. 18 is a diagram illustrating an information leakage detecting process using authentication information in the unauthorized access detecting system according to the second embodiment.

By use of FIG. 18, an information leakage detecting process using authentication information in the unauthorized access detecting system 200 according to the second embodiment will be described. FIG. 18 is a diagram illustrating the information leakage detecting process using authentication information in the unauthorized access detecting system according to the second embodiment. As illustrated in FIG. 18, the authentication information management device 210 of the unauthorized access detecting system 200 generates, every time a program is analyzed, unique analysis authentication information (a set of a server name that provides a service, an account name, and password information), and performs notification thereof (see (1) in FIG. 18).

The generated analysis authentication information is set on the analyzing host 220 that executes a program (see (2) in FIG. 18) and the program to be analyzed is executed (see (3) in FIG. 18). Further, the analyzing host 220 notifies the authentication information management device 210 of the set of authentication information corresponding to the executed program (see (4) in FIG. 18). The authentication information management device 210 then notifies the server 230 that provides a service, of the generated analysis authentication information (see (5) in FIG. 18).

Thereafter, after executing the program to be analyzed, if the program is malware that leaks out information, the analyzing host 220 transmits the set analysis authentication information to the attacker (see (6) in FIG. 18). There is no need to determine whether the program has leaked out information at this point. The attacker makes unauthorized access with respect to the service and attempts login, by using the leaked authentication information (see (7) in FIG. 18). The server 230 that provides the service identifies whether the login in login using the analysis authentication information, and if the login is login using the analysis authentication information, the login is detected as unauthorized access (see (8) in FIG. 18). Since the analyzed program is able to be identified from the analysis authentication information used in the login, the program is able to be identified as a program that leaks out information.

Figure 19:
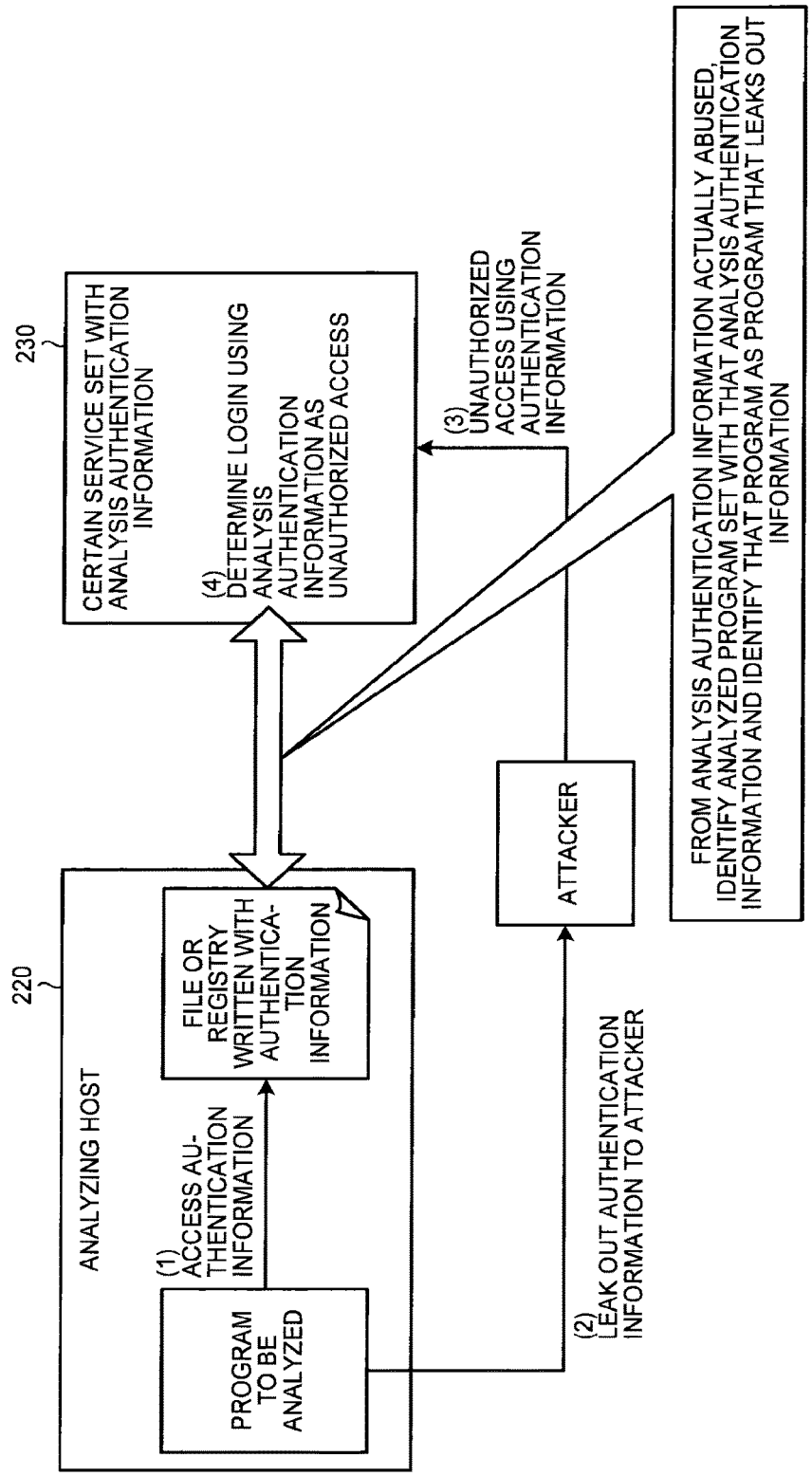
FIG. 19 is a diagram illustrating a process of identifying malware that leaks out information, in the unauthorized access detecting system according to the second embodiment.

By use of FIG. 19, a process of identifying malware that leaks out information in the unauthorized access detecting system 200 according to the second embodiment will be described. FIG. 19 is a diagram illustrating the process of identifying malware that leaks out information, in the unauthorized access detecting system according to the second embodiment.

As illustrated in FIG. 19, the analyzing host 220 sets, as authentication information of a particular service on the analyzing host 220, the authentication information generated by the authentication information management device 210, and when a program is operated, if the program to be analyzed is malware that leaks out information, the analyzing host 220 accesses a file or registry, in which the above described authentication information has been stored (see (1) in FIG. 19). The analyzing host 220 then secretly leaks out the authentication information without the user's consent to an outside attacker (see (2) in FIG. 19).

Next, while the server 230 that provides a particular service is being operated, login is observed. If login by the attacker using the leaked authentication information is performed (see (3) in FIG. 19), the server 230 determines that the login is of unauthorized access (see (4) in FIG. 19). From the authentication information used in the unauthorized access, the program that has been set with the authentication information and analyzed is able to be identified, and further, it is able to be concluded that this program has leaked out information. Therefore, malware that leaks out information is able to be identified accurately.

[Process by Server]

Figure 20:
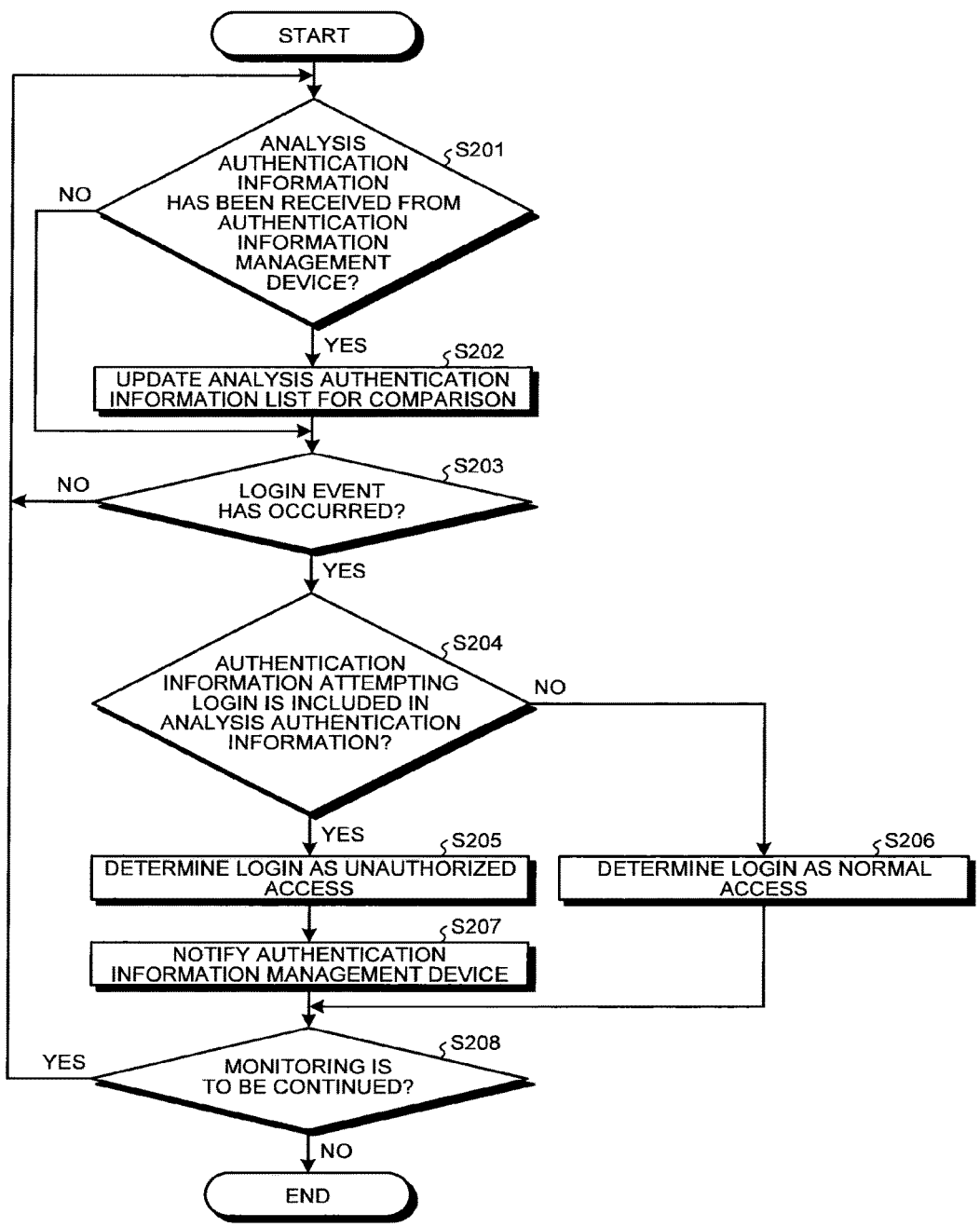
FIG. 20 is a flow chart illustrating a flow of an unauthorized access detecting process in the server of the unauthorized access detecting system according to the second embodiment.

Next, by use of FIG. 20, a process by the server 230 according to the second embodiment will be described. FIG. 20 is a flow chart illustrating a flow of an unauthorized access detecting process in the server of the unauthorized access detecting system according to the second embodiment.

As illustrated in FIG. 20, the communication processing unit 231 of the server 230 determines whether analysis authentication information has been received from the authentication information management device 210 (Step S201). As a result, if the communication processing unit 231 has not received the analysis authentication information from the authentication information management device 210 (Step S201: No), the process is advanced to processing of Step S203. Further, if the analysis authentication information has been received from the authentication information management device 210 (Step S201: Yes), the communication processing unit 231 updates the list of analysis authentication information for comparison stored in the analysis authentication information storage unit 233a (Step S202).

The detecting unit 232a then determines whether or not a login event has occurred with respect to a content, for which an analysis account corresponding to the analysis authentication information has been prepared (Step S203). As a result, if the login event has not occurred (Step S203: No), the process is returned to the processing of Step S201. Further, if a login event has occurred (Step S203: Yes), the detecting unit 232a determines whether the authentication information used in the login is included in the analysis authentication information stored in the analysis authentication information storage unit 233a (Step S204).

As a result, if the authentication information used in the login is not included in the analysis authentication information stored in the analysis authentication information storage unit 233a (Step S204: No), the detecting unit 232a determines the login to be of normal access (Step S206) and executes processing of later described Step S208. Further, if the authentication information used in the login is included in the analysis authentication information stored in the analysis authentication information storage unit 233*a* (Step S204: Yes), the detecting unit 232*a* determines the login to be of unauthorized access (Step S205).

Subsequently, the detecting unit 232*a* notifies the authentication information management device 210 of the authentication information used in the unauthorized access (Step S207), and determines whether or not monitoring of unauthorized access is to be continued (Step S208). As a result, if it is determined that the monitoring of unauthorized access is to be continued (Step S208: Yes), the process is returned to Step S201. Further, if the detecting unit 232*a* determines that the monitoring of unauthorized access is not to be continued (Step S208: No), the process is ended.

[Effects of Second Embodiment]

As described above, in the unauthorized access detecting system 200 according to the second embodiment, authentication information is generated, the generated authentication information is set on the analyzing host 220, and a program to be analyzed is operated on the analyzing host 220. Unauthorized access to a content using the authentication information is detected, and if unauthorized access using the authentication information is detected, the program operating on the analyzing host 220 set with the authentication information is identified as a program that leaks out information. Therefore, malware that leaks out information is able to be identified accurately.

Further, in the unauthorized access detecting system 200, a program, in particular, malware, has analysis-resistant functions, and thus analysis of program codes, analysis of behaviors, and analysis of contents of communication are generally difficult. In this embodiment, without identifying a code that executes information leakage and analyzing behaviors of the program or contents of communication that the program transmits outside, the program that leaks out information (malware) is able to be accurately identified.

[System Configuration and the Like]

Further, each component of the respective devices in the drawings is functionally and conceptionally illustrated, and is not necessarily physically configured as illustrated in the drawings. That is, specific modes of distribution and integration of the respective devices are not limited to those illustrated in the drawings, and depending on various loads and use situations, all or some of the devices may be configured to be functionally or physically distributed or integrated in arbitrary units. For example, the generating unit 12*a* and the management unit 12*b* may be integrated with each other. Further, all or any part of the processing functions executed by the respective devices may be realized by a CPU and a program analyzed and executed by the CPU, or may be implemented as hardware by wired logic.

Further, of the respective processes described in the embodiments, all or a part of the processes described as being executed automatically may be manually executed, or all or a part of the processes described as being executed manually may be automatically executed by a known method. In addition, the procedural sequences, control sequences, specific names, and information including various data and parameters described above and illustrated in the drawings may be arbitrarily modified unless otherwise particularly stated.

[Program]

Further, programs, which describe, in a language executable by a computer, the processes executed by the respective devices in the unauthorized access detecting systems 100 and 200 described in the embodiments, may be generated. For example, an unauthorized access detecting program, which describes, in a language executable by a computer, the process executed by each of the devices in the unauthorized access detecting system 100 according to the first embodiment or the unauthorized access detecting system 200 according to the second embodiment, may be generated. In this case, by the computer executing the unauthorized access detecting program, effects that are the same as those of the above embodiments are able to be obtained. Further, by recording that unauthorized access detecting program in a computer readable recording medium and causing the computer to load the unauthorized access detecting program recorded in this recording medium to execute the unauthorized access detecting program, processing that is the same as that of the first embodiment or the second embodiment may be realized.

Figure 21:
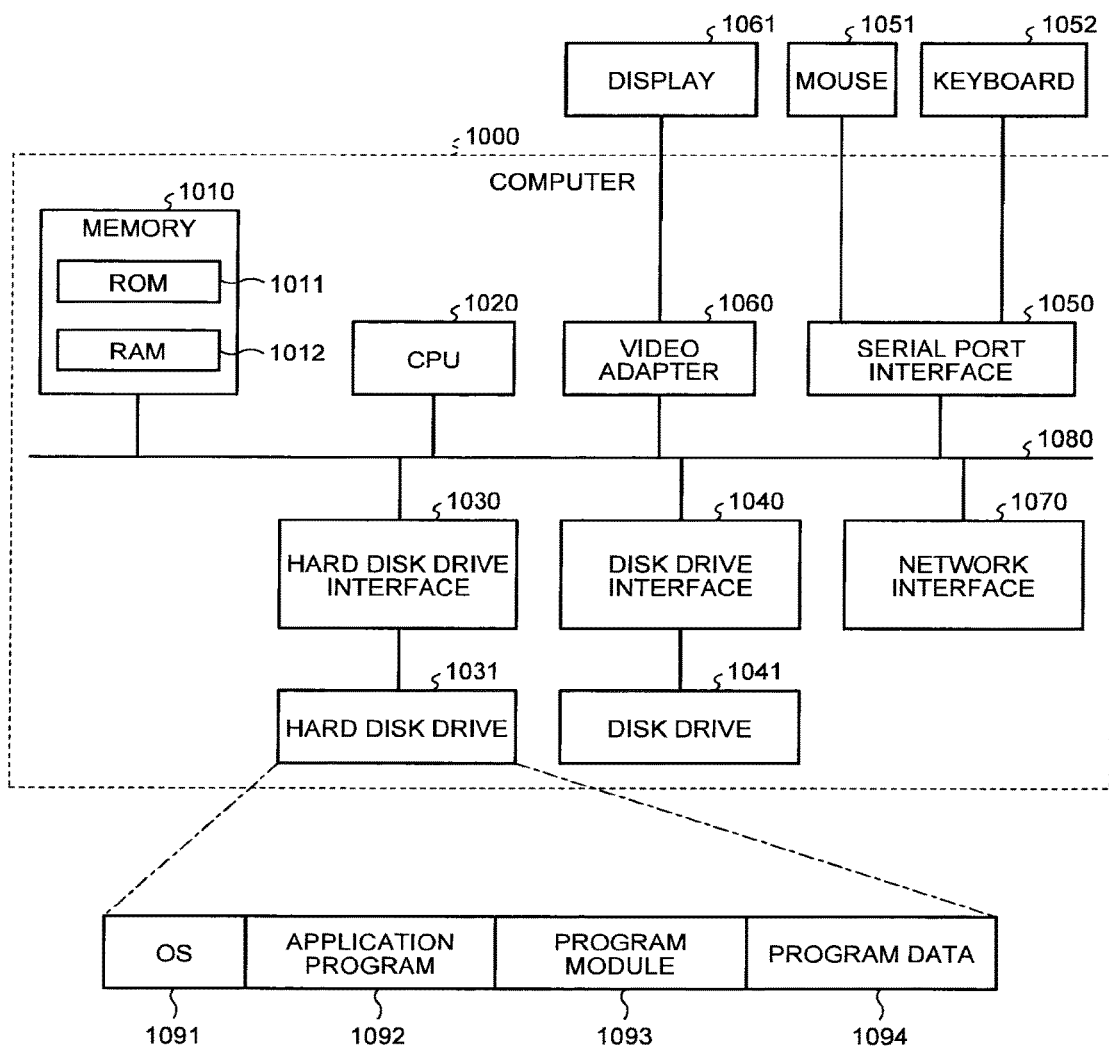
FIG. 21 is a diagram illustrating a computer that executes an unauthorized access detecting program.

FIG. 21 is a diagram illustrating a computer 1000 that executes the unauthorized access detecting program. As exemplified in FIG. 21, the computer 1000 has, for example, a memory 1010, a CPU 1020, a hard disk drive interface 1030, a disk drive interface 1040, a serial port interface 1050, a video adapter 1060, and a network interface 1070, and these are connected to one another by a bus 1080.

The memory 1010 includes, as exemplified in FIG. 21, a read only memory (ROM) 1011 and a RAM 1012. The ROM 1011 stores therein a boot program, such as a basic input output system (BIOS), for example. The hard disk drive interface 1030 is, as exemplified in FIG. 21, connected to a hard disk drive 1031. The disk drive interface 1040 is, as exemplified in FIG. 21, connected to a disk drive 1041. An attachable and detachable storage medium, such as a magnetic disk or an optical disk, for example, is inserted into the disk drive 1041. The serial port interface 1050 is, as exemplified in FIG. 21, connected to, for example, a mouse 1051 and a keyboard 1052. The video adapter 1060 is, as exemplified in FIG. 21, connected to, for example, a display 1061.

As exemplified in FIG. 21, the hard disk drive 1031 stores therein, for example, an OS 1091, an application program 1092, a program module 1093, and program data 1094. That is, the above described unauthorized access detecting program is stored, as a program module in which commands executed by the computer 1000 are described, in the hard disk drive 1031, for example.

Further, the various data described in the embodiments are stored in, for example, the memory 1010 or the hard disk drive 1031, as program data. The CPU 1020 reads, as necessary, the program module 1093 and program data 1094 stored in the memory 1010 or hard disk drive 1031 out to the RAM 1012, and executes various procedures.

The program module 1093 and program data 1094 related to the unauthorized access detecting program are not necessarily stored in the hard disk drive 1031, and may be stored in an attachable and detachable storage medium to be read out by the CPU 1020 via the disk drive or the like, for example. Or, the program module 1093 or program data 1094 related to the unauthorized access detecting program may be stored in another computer connected via a network (a local area network (LAN), a wide area network (WAN), or the like) and read out via the network interface 1070 by the CPU 1020.

REFERENCE SIGNS LIST

10, 210 AUTHENTICATION INFORMATION MANAGEMENT DEVICE

11, 21, 31, 41, 211, 221, 231 COMMUNICATION PROCESSING UNIT 12, 22, 32, 42, 212, 222, 232 CONTROL UNIT
12a, 212a GENERATING UNIT
12b, 212b MANAGEMENT UNIT
13, 23, 33, 43, 213, 223, 233 STORAGE UNIT
13a, 23a, 33a, 213a, 223a, 233a ANALYSIS AUTHENTICATION INFORMATION STORAGE UNIT
20, 220 ANALYZING HOST
22a, 222a SETTING UNIT
22b, 222b OPERATING UNIT
30, 230 SERVER
32a, 232a DETECTING UNIT
32b IDENTIFYING UNIT
32c, 42a STORING UNIT
32d ACCESS PREVENTING UNIT
33b, 43a MALICIOUS HOST INFORMATION STORAGE UNIT
40 UNAUTHORIZED ACCESS INFORMATION MANAGEMENT DEVICE
42b TRANSMITTING UNIT
43b SERVER INFORMATION STORAGE UNIT
50, 240 THE INTERNET
100, 200 UNAUTHORIZED ACCESS DETECTING SYSTEM
212c IDENTIFYING UNIT
212d COLLECTING UNIT
213b MALICIOUS PROGRAM STORAGE UNIT
232b DELETING UNIT

The invention claimed is:

1. An unauthorized access detecting system, comprising: processing circuitry configured to
   generate authentication information that is used to log in to a predetermined server,
   set the generated authentication information generated on a predetermined analyzing host and cause a program to be analyzed to operate on the predetermined analyzing host, wherein the program is allowed access to the set authentication information,
   detect unauthorized access to a content at a predetermined server using the authentication information,
   obtain a program corresponding to the authentication information by referring to a table stored in a memory, the table prescribing correspondence between the authentication information and the program, and
   identify, as a program that leaks out information, the program that operates on the predetermined analyzing host set with the authentication information if unauthorized access using the authentication information has been detected.

2. The unauthorized access detecting system according to claim 1, wherein the memory stores therein the generated authentication information, and the processing circuitry determines whether authentication information used in access to the content coincides with the authentication information stored in the memory, and if there is coincidence, the processing circuitry detects the access as unauthorized access.

3. The unauthorized access detecting system according to claim 1, the processing circuitry being configured to detect the identified program and delete the program when the program is detected.

4. The unauthorized access detecting system according to claim 1, wherein the identified program was collected from the Internet.

5. An unauthorized access detecting method executed by an unauthorized access detecting system, the unauthorized access detecting method including:
   a generating step of generating authentication information that is used to log in to a predetermined server;
   an operating step of setting the authentication information generated by the generating step on a predetermined analyzing host and causing a program to be analyzed to operate on the predetermined analyzing host, wherein the program is allowed access to the set authentication information;
   a detecting step of detecting unauthorized access to a content at the predetermined server using the authentication information;
   an obtaining step of obtaining a program corresponding to the authentication information by referring to a table stored in a memory, the table prescribing correspondence between the authentication information and the program, and
   an identifying step of identifying, if unauthorized access using the authentication information is detected by the detecting step, a program that operates on the predetermined analyzing host set with the authentication information, as a program that leaks out information.

6. The unauthorized access detecting method according to claim 5, further including a storing step of storing the authentication information generated by the generating step into the memory, wherein
   in the detecting step, whether authentication information used in access to the content coincides with the authentication information stored in the memory is determined, and if there is coincidence, the access is detected as unauthorized access.

7. The unauthorized access detecting method according to claim 5, further including a deleting step of detecting the program identified by the identifying step, and deleting the program if the program is detected.

8. The unauthorized access detecting method according to claim 5, wherein the identified program was collected from the Internet.

* * * * *